(12) United States Patent
Gotou et al.

(10) Patent No.: US 6,983,207 B2
(45) Date of Patent: Jan. 3, 2006

(54) MACHINE COMPONENT MONITORING, DIAGNOSING AND SELLING SYSTEM

(75) Inventors: Yasuhiro Gotou, Tokyo (JP); Hiroyuki Hakamata, Iwata (JP); Masataka Azuma, Tokyo (JP)

(73) Assignee: NTN Corporation, Osaka (JP)

( * ) Notice: Subject to any disclaimer, the term of this patent is extended or adjusted under 35 U.S.C. 154(b) by 669 days.

(21) Appl. No.: 09/880,931

(22) Filed: Jun. 15, 2001

(65) Prior Publication Data

US 2002/0013635 A1 Jan. 31, 2002

(30) Foreign Application Priority Data

Jun. 16, 2000 (JP) .................................... 2000-180890
Aug. 25, 2000 (JP) .................................... 2000-255721

(51) Int. Cl.
*G01B 5/28* (2006.01)

(52) U.S. Cl. ........................ 702/35; 702/183; 73/462; 700/108

(58) Field of Classification Search ............. 702/33–35, 702/66, 71, 113–114, 179–181, 182–185; 73/460, 462, 649; 700/108–110, 231–233
See application file for complete search history.

(56) References Cited

U.S. PATENT DOCUMENTS

| | | | | |
|---|---|---|---|---|
| 5,027,293 A | * | 6/1991 | Pung et al. | ................. 702/185 |
| 5,566,092 A | * | 10/1996 | Wang et al. | ................. 702/185 |
| 5,710,723 A | * | 1/1998 | Hoth et al. | .................. 702/181 |
| 5,769,269 A | * | 6/1998 | Peters | ............................ 221/7 |
| 5,854,994 A | | 12/1998 | Canada et al. | |
| 6,006,194 A | * | 12/1999 | Merel | ............................. 705/8 |
| 6,064,002 A | * | 5/2000 | Hayami et al. | ............. 174/52.1 |
| 6,199,018 B1 | * | 3/2001 | Quist et al. | .................... 702/34 |
| 6,272,437 B1 | * | 8/2001 | Woods et al. | .................. 702/35 |
| 6,553,336 B1 | * | 4/2003 | Johnson et al. | ............. 702/188 |

FOREIGN PATENT DOCUMENTS

| | | |
|---|---|---|
| EP | 0 599 606 A2 | 6/1994 |
| EP | 0 810 555 A2 | 12/1997 |
| GB | 2338848 | 12/1999 |

* cited by examiner

*Primary Examiner*—Marc S. Hoff
*Assistant Examiner*—Mary Catherine Baran

(57) ABSTRACT

A system monitoring statuses such as presence and absence of abnormality and lifetime of a machine component such as, for example, a bearing having rolling elements, includes: a plurality of determining units respectively connected with a plurality of sensors, and a control unit connected with the determining units. Each sensor is disposed on the machine component of the associated rolling bearing to detect an influence signal resulting from passage of the rolling element induced in the machine component. Each determining unit determines, according a process set-up condition, the presence and absence of an abnormality and lifetime of the machine component associated with the sensor in reference to an output signal from the sensors. The control unit collects a result of determination performed by each determining unit. In this way, with a simplified structure, monitoring can be achieved at a low cost, precisely and efficiently.

47 Claims, 23 Drawing Sheets

Fig.30A

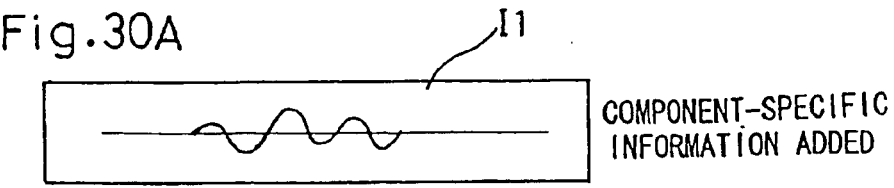

COMPONENT-SPECIFIC INFORMATION ADDED

Fig.30B

```
·COMPONENT-SPECIFIC INFORMATION
·USABLE
·NOT USABLE
·USABLE TERM
·HUMAN DIAGNOSIS INFORMATION
```
I2

Fig.30C

| DIAGNOSIS RESULT INFORMATION | MERCHANDISE INFORMATION | ORDER QUERY INFORMATION |
|---|---|---|
| | PRICE INFORMATION<br>DELIVERY INFORMATION<br>(AVAILABLE, NOT AVAILABLE)<br>REPAIR INFORMATION<br>(REPAIRABLE) | ORDER/SUSPENSION<br>EXPECTED DELIVERY DATE |

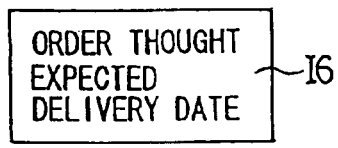

ORDER THOUGHT
EXPECTED
DELIVERY DATE
I6

Fig.31

MERCHANDISE ADDED DIAGNOSIS
RESULT INFORMATION GROUP

| COMPONENT-SPECIFIC INFORMATION | DIAGNOSIS RESULT INFORMATION | MERCHANDISE INFORMATION | ORDER QUERY INFORMATION | |
|---|---|---|---|---|
| ITEM NO.○○ | ······ | ······ | ······ | ← 15 |
| ITEM NO.○○ | ······ | ······ | ······ | ← 15 |
| ITEM NO.○○ | ······ | ······ | ······ | |

MACHINE COMPONENT MONITORING, DIAGNOSING AND SELLING SYSTEM

BACKGROUND OF THE INVENTION

1. Field of the Invention

The present invention relates to a machine component monitoring system for monitoring statuses, such as the presence or absence of an abnormality, and/or lifetime of machine components employed in a machine system such as an iron working plant or a paper making plant, that are equipped with the machine components, each machine component having rolling elements such as rolling bearings, constant speed joints, or ball screw mechanisms, to a machine component monitoring and diagnosing system, enabling a manufacturer to monitor and diagnose the statuses at a remote location, and to a machine component monitoring, diagnosing, and selling system adding merchandise information to results of diagnosis after the machine components have been monitored and diagnosed.

2. Description of the Related Art

As is well known to those skilled in the art, an iron working plant or a paper making plant employs a number of rolls, and roll support bearings are used to support those rolls. The roll support bearings, particularly, rolling roll support bearings used in a continuous casting machine, are used under a relatively large load and at an elevated temperature, that is under severe operating conditions. Since sudden interruption of the operation of the plants as a result of an abnormality occurring in some of the support bearings would likely result in a considerable loss, the support bearings are regularly replaced at intervals of a few months.

During the routine replacement, it often occurs that some support bearings that are still usable are replaced in anticipation of safety. Thus, some of the support bearings are used uneconomically, resulting in an increase of the cost of maintenance of the facilities. If there was a way to grasp the status of the lifetime of each support bearing, the time span between the succeeding replacements of the support bearings can be prolonged. Accordingly, attempts have been made to use vibrations sensors to monitor the status of the lifetime of each support bearing, but since the number of the support bearings used is considerable, a relatively high cost is incurred in monitoring those support bearings.

As is discussed above, the roll support bearings used in the iron working plant or the paper making plant are monitored by the use of the above-described vibration sensors, to determine the status of the lifetime of each support bearing. But since each support bearing is of a relatively large size, the iron working plant and the paper making plant often perform their own monitoring schemes to determine and diagnose the status of the lifetime of each support bearing using the vibration sensors as a routine for maintenance of the facilities. Specifically, based on the status of the lifetime obtained as a result of monitoring, the iron working plant or the paper making plant set up a plan to replace the machine components, ask the manufacturer of the support bearings for estimates for the replacement, and order the support bearings to be replaced after the stock, the price, and the expected date of delivery have been confirmed.

Similar monitoring and diagnosis are also performed in other facilities, such as a production line, or automobile or railway train servicing facilities in traffic industries. Where the particular plant cannot perform the diagnosis on its own, the plant makes it practice to call for a technician from the bearing manufacturer to make a diagnosis in situ at the plant.

But with a diagnosing instrument used in the iron working plant or the paper making plant, and also with the technician in the other plants, a problem has been encountered that an accurate diagnosis is difficult to achieve. In the event of an abnormality resulting from an erroneous diagnosis, a loss such as sudden scramming of the plant would occur. For this reason, some spare bearings have to be stocked in hand in anticipation of the erroneous diagnosis. By way of example, a paper making system used in the paper making plant makes use of 200 to 300 rolls with their opposite ends rotatably supported by respective bearings, thus utilizing a relatively large number of the bearings. Accordingly, for all of those bearings to keep in good operating conditions, monitoring and diagnosing have to be performed frequently and on a regular basis, thus requiring a relatively large number of spare bearings to be stored in anticipation of future replacement.

Employment of diagnosing instruments and/or technicians in the iron working plant or the paper making plant is indeed uneconomical since the diagnosing instruments and/or the technicians sometimes lead to unnecessary expenditure.

Also, if after the machine components, i.e., the bearings have been diagnosed at the iron working plant or the paper making plant, the attendant worker consults with a sales representative sent from the bearing manufacturer, then a relatively large amount of time and labor required, and because of it, it often occurs that delivery of the ordered bearing will be delayed. Under these circumstances, the plant would be required to store the spare bearings for use in the future. On the other hand, even the bearing manufacturer would be required to store a large amount of bearings in anticipation of varying orders. Additionally, the bearing manufacturer has to employ personnel for sales activities, and thus has a relatively large amount of expenditure for personnel shift.

SUMMARY OF THE INVENTION

Accordingly, the present invention has for its primary aspect to provide a system capable of efficiently monitoring the status of lifetime of machine components.

To accomplish this aspect, the present invention provides a monitoring system monitoring machine components, employed in a machine system utilizing a plurality of such machine components each having rolling elements. A plurality of determining units, each electrically connected, respectively with a plurality of sensors are connected with a common control unit. Each of the sensors is arranged on the respective machine component to detect an influence signal resulting from passage of the rolling elements induced in the machine component. Each of the determining units determines, according to a predetermined process set-up condition, status, such as presence and absence of an abnormality, and lifetime of the machine component, which is associated with such sensor, in reference to an output signal from the associated sensor. The control unit collects results of determination performed by each of the determining units.

According to one aspect, when determining the status, each of the determining units determines the presence and absence of an abnormality in a sensor waveform, which is the output signal from the associated sensor, as a determining process.

According to one aspect, each of the determining units determines whether a defect signal component contained in the sensor waveform deviates from a predefined range, and in the event that the defect signal has been determined as deviating from the predefined range, determines the presence of a defect waveform abnormality as the abnormality in the sensor waveform.

According to one aspect, each of the determining units compares sensor waveform main signal cydes of the plural sensors connected therewith, and in the event that the main signal cycle is not found within a predefined range, determines the presence of a rotation abnormality as the abnormality in the sensor waveform.

According to one aspect, each of the determining units detects one of a presence and an absence of an abnormality, which is an abnormality resulting from the respective determining unit itself, and a sensor waveform abnormality resulting from the sensor waveform.

According to one aspect, the control unit makes a transmission request sequentially to the determining units, and each of the determining units transmits a result of determination to the control units in response to the transmission request.

According to one aspect, the control unit commands setting and changing of the process set-up condition for each of the determining units, and each of the determining units changes the process set-up condition according to the command from the control units.

According to one aspect, each of the determining units has a plurality of waveform processing units processing the sensor waveform according to different waveform processing techniques, and selects one of the waveform processing units that is to be used for processing the sensor waveform. In such case, the control applies a selection command necessary to select one of the waveform processing units for the particular determining unit.

According to one aspect, each of the determining units has a plurality of waveform processing units processing the sensor waveform according to different waveform processing techniques, and selects one of the waveform processing units for each of the sensors.

According to one aspect, wiring used to connect the determining units and the associated sensors is a sheathed sensor cable that is water proof, dust proof, rust proof, and moisture proof, and resists oil, heat, and electromagnetic noise.

According to one aspect, each of the determining units has a relay terminal, and the determining units are sequentially wired together through the respective relay terminals.

According to one aspect, where the machine system is an aggregation of a plurality of machine system constituent elements, each including the plural machine components, and each of the determining units is used one for each of the machine system constituent elements and the sensor connected with each of the determining units may be arranged on the machine component provided in one of the machine system constituent elements that is associated with such determining unit.

The control unit has an automatic monitoring mode and a terminal operated mode. In the automatic monitoring mode, a result of determination performed by each of the determining units is acquired by sequentially issuing a transmission request to request the respective determining unit to send the result of determination, whereas in the terminal operated mode, when a transmission request is made to request the respective determining unit to send the result of determination and information other than the result of determination a response thereto is acquired.

According to one aspect, each of the determining units captures as digital data, the sensor waveform which is the output signal from each of the sensors connected therewith, and in such case the control units includes a waveform data storage unit storing the sensor waveform that is the digital data captured by each of the determining units.

According to one aspect, a maintenance information generating unit is employed to generate predetermined maintenance information associated with the machine component, based on a result of determination performed by each of the determining units.

According to another aspect, an information processing unit is positioned at a location remote from the control units and connected with the control units through a communication network. In this case, the control unit collects not only a result of determination performed by each of the determining units, but also a sensor waveform inputted to each determining unit. The information processing unit includes a remote data collector unit collecting the result of determination and the sensor waveform which the control units has collected from each of the determining units.

A machine component monitoring and diagnosing system according to an aspect of the present invention monitors and diagnoses a machine component having rolling elements. This machine component monitoring and diagnosing system includes a sensor detecting a factor associated with a lifetime of a machine component incorporated in a machine used at a business establishment of a client corporation; a sensor information transmitting unit transmitting at least one of information detected by the sensor and information processed with such detected information to a line; a sensor information receiving unit installed at a business establishment of a manufacturing and selling corporation, which manufactures and sells the machine component, receiving the sensor information transmitted through the line; a diagnosing unit diagnosing a state of the lifetime of the machine component in reference to the sensor information received by the sensor information receiving unit; a diagnosis result information transmitting unit transmitting diagnosis result information from the diagnosing unit, to the line; and a diagnosis result information receiving unit installed at the business establishment of the client corporation, receiving the diagnosis result information transmitted through the line. The diagnosing unit includes an examining section to automatically determine, when the sensor information is inputted, whether at least the machine component is properly usable, and a manual diagnosing section to at least one of add a result of diagnosis performed by a person to the result of diagnosis performed by the examining section, and modify the result of diagnosis performed by the examining section based on the result of diagnosis performed by the person.

According to another aspect of the present invention, there is provided a machine component monitoring and diagnosing system monitoring and diagnosing a machine component having rolling elements. This monitoring and diagnosing system includes: a sensor information receiving unit installed at a business establishment of a manufacturing and selling corporation manufacturing and selling the machine component, receiving through a line information detected by a sensor detecting a factor associated with a lifetime of the machine component incorporated in a machine used by a client corporation located at a remote place; a diagnosing unit diagnosing a state of the lifetime of the machine component in reference to the sensor information received by sensor information receiving unit; and a diagnosis result information transmitting unit transmitting information on a result of diagnosis by the diagnosing unit to the line (109). The diagnosing unit includes an examining section to automatically determine, when the sensor information is inputted, whether at least the machine component is properly usable, and a manual diagnosing section to at least one of add a result of diagnosis performed by a person to the result of diagnosis performed by the examining section, and modify the result of diagnosis performed by the examining section based on the result of diagnosis performed by the person.

The sensor information transmitting unit includes an information collecting section collecting the information detected by each of sensors, the sensors being provided one for each of a plurality of machine components, and an information transmitting section transmitting the information, collected by the information collecting section, to the line.

According to one aspect, the diagnosis result information from the diagnosing unit includes a result of determination of whether the machine component is properly usable, and a result of determination of an available term of use if the machine component has been determined properly usable.

According to one aspect, the sensor detects at least one of vibration waveform, temperature, and image.

According to one aspect, the diagnosing utilizes a database for diagnosis, in which specifications for each type of the machine components (1) and examples of diagnosis are registered.

According to one aspect, the diagnosing utilizes a database for diagnosis, in which environments of use of the machine components (1) are registered.

According to one aspect, each of the sensor information transmitting unit and the sensor information receiving unit performs a bidirectional communication, and the sensor information transmitting unit transmits the sensor information in response to a request signal from the sensor information receiving.

According to one aspect, the sensor information transmitting unit transmits the sensor information on a regular basis, even when a predetermined abnormality signal is received.

According to one aspect, the machine in the business establishment of the client corporation has a shaft, and the machine component to be detected by the sensor is a bearing supporting the shaft. In this case, the sensor information transmitting unit transmits the sensor information on the bearing to the line (109).

According to one aspect, there is a machine component monitoring, diagnosing, and that makes use of the monitoring and diagnosing system of any of the structures described hereinbefore. Specifically, the machine component monitoring, diagnosing and selling system additionally includes a merchandise information adding unit generating merchandise information associated with the diagnosed machine component in accordance with diagnosis result information of the diagnosing unit and adding this merchandise information to the diagnosis result information. The diagnosis result information transmitting unit transmits merchandise information, added diagnosis result information which is the diagnosis result information added with the merchandise information.

According to one aspect, the merchandise information added by the merchandise information adding unit includes price information and delivery date information.

According to one aspect, there is an order processing unit generating arrangement information of delivery of the machine component according to contents ordered in the agreement information that is received by the diagnosis result information transmitting unit.

According to one aspect, there is an electronic decision making unit making a decision according to electronic information in accordance with contents of the order contained in the agreement information received by the diagnosis result information transmitting unit.

According to one aspect, there is a diagnosis result utilizing production planning support unit utilizing the diagnosis result of the diagnosing unit in planning a production of the machine component.

The present invention also provides a machine component monitoring and diagnosing method monitoring and diagnosing a machine component having rolling elements through a computer network. This method includes, at a business establishment of a corporation manufacturing and selling the machine component: receiving through a line, information detected by a sensor detecting a factor associated with a lifetime of the machine component, incorporated in a machine used by a client corporation at a remote location; diagnosing a status of lifetime of the machine component based on the received sensor information by using an examining section and a manual diagnosing section; transmitting diagnosis result information, obtained as a result of the diagnosing, to the client corporation through the line; and planning a production of the machine component using a diagnosis result utilizing production planning support unit utilizing the diagnosis result information.

According to one aspect, the machine component monitoring, diagnosing and selling method additionally includes: generating merchandise information associated with the diagnosed machine component in accordance with diagnosis result information obtained as a result of the diagnosing, and transmitting the diagnosis result information, together with the merchandise information to the client corporation, through the line.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like components throughout the several views, and:

FIG. 30A is an explanatory diagram showing contents of the sensor information in the monitoring, diagnosing and selling system;

FIG. 30B is an explanatory diagram showing contents of diagnosis result information in such monitoring, diagnosing and selling system;

FIG. 30C is an explanatory diagram showing contents of merchandise information added diagnosis result information in such monitoring, diagnosing and selling system;

FIG. 30D is an explanatory diagram showing contents of order information in such monitoring, diagnosing and selling system;

FIG. 31 is an explanatory diagram showing contents of a group of merchandise information added diagnosis result information in the monitoring, diagnosing and selling system;

DETAILED DESCRIPTION OF THE PREFERRED EMBODIMENTS

Figure 1:
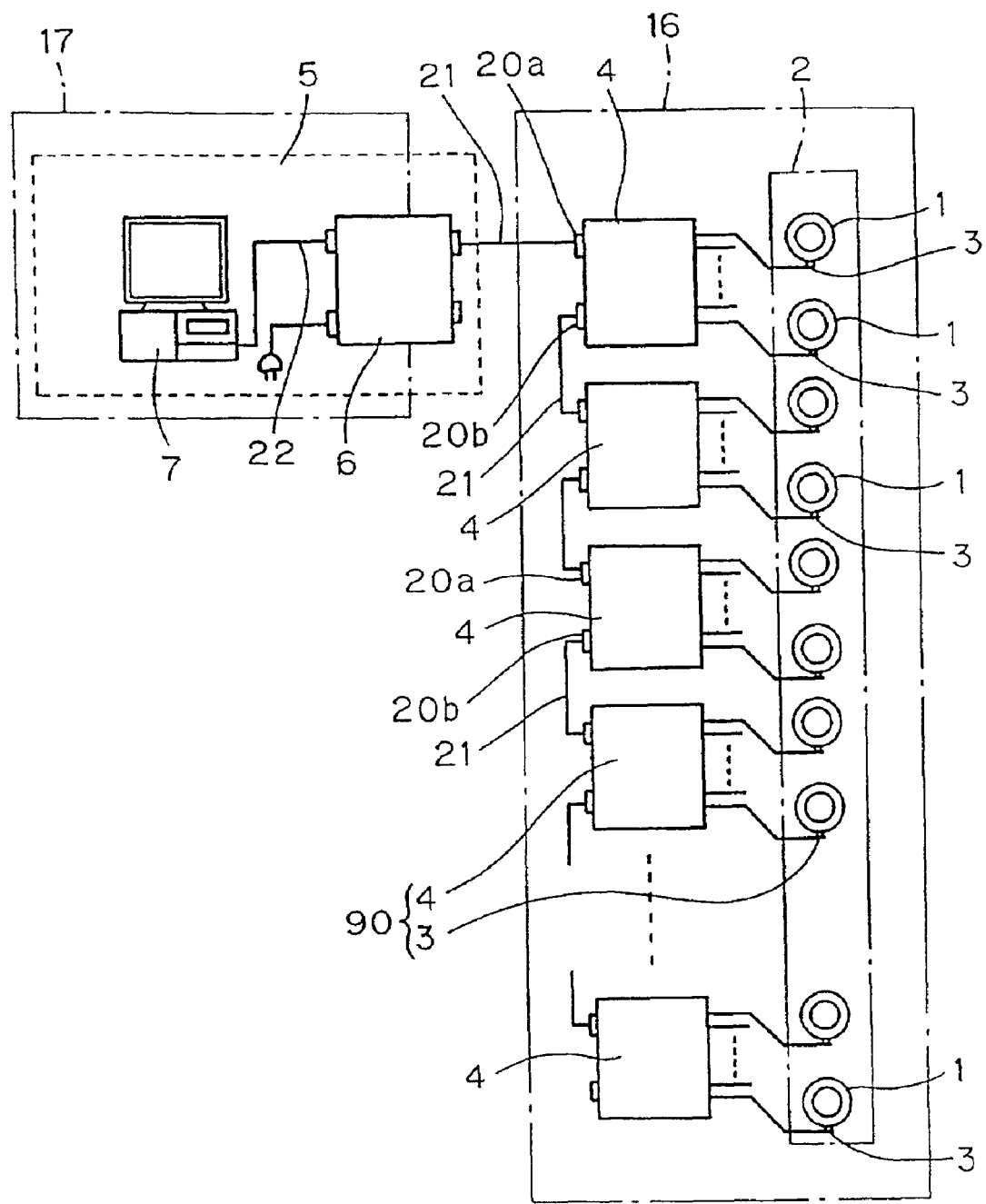
FIG. 1 is a system diagram showing a machine component monitoring system according to one embodiment of a monitoring system of the present invention.

Preferred embodiments of the present invention will now be described with reference to the accompanying drawings. Shown in FIG. 1 is a monitoring system embodying the present Invention, which is used for monitoring a plurality of machine components 1 employed in a machine system 2 and including rolling elements. This monitoring system includes a plurality of determining units 4 each electrically connected with a plurality of sensors 3 and a control unit 5 common to and electrically connected with the determining units 4. The sensors 3 are installed one for each of the machine components 1 and positioned in the vicinity of the respective machine component 1. Each of the determining units 4 is operable in response to an output signal from the sensors 3 that are connected therewith to determine the status such as, for example, the presence or absence of an abnormality and/or the lifetime of the machine components 1, associated with such sensors 3, according to a predetermined process set-up condition. The control unit 5 has a capability of collecting results of determination performed by the determining units 4, and a capability of issuing setting commands or the like to each of the determining units 4. The control unit 5 includes an electric power unit feeding an electric power to all of the determining units 4. The control unit 5 may be a stand-alone instrument, but in the illustrated embodiment the control unit 5 comprises a dedicated controller 6 and a general purpose Information processing device 7 such as, for example, a personal computer to collect data or perform other functions. Each of the determining units 4 and the associated sensors 3 altogether constitute a sensing/determining unit 90.

Figure 2:
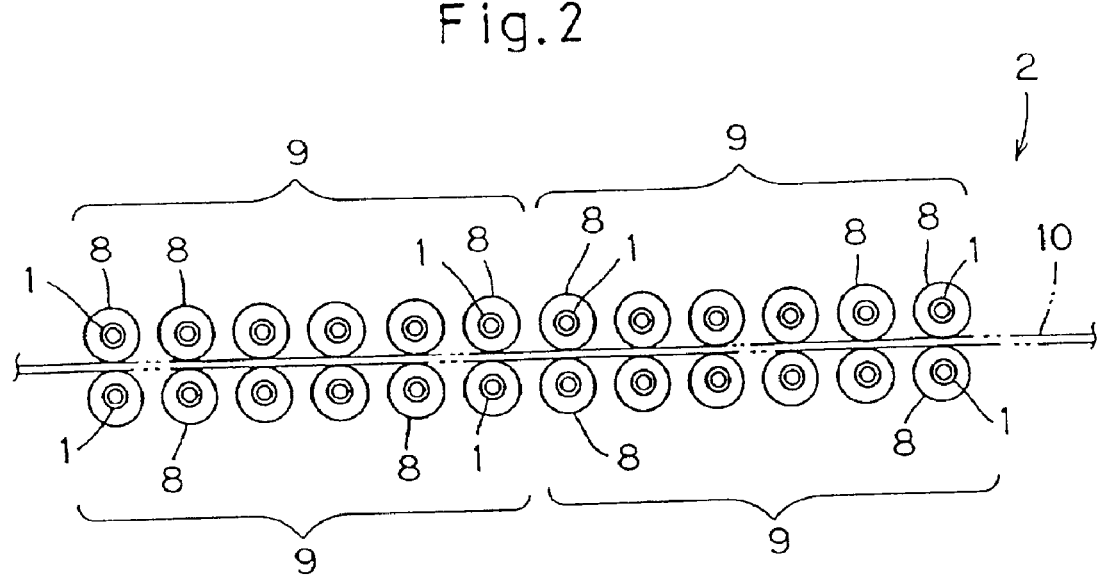
FIG. 2 is a side view showing one example of a machine system utilizing the monitoring system shown in FIG. 1.

The machine system 2 may include, for example, a plurality of rolls 8 as shown in FIG. 2, each of which rolls 8 is rotatably supported at its opposite ends by the machine components 1 that are employed in the form of rolling bearings. The rolls 8 are grouped into a plurality of sets of machine system constituents 9 each set including a plurality of rolls 8 arranged on a common constituent frame (not shown). Each set of the machine system constituents 9 is detachably mounted on a machine framework (not shown) of the machine system 2.In the illustrated embodiment, each machine system constituent 9 includes a plurality of, for example, eight, rolls 8 and is referred to as, for example, a segment or the like. The machine system 2 is, for example, a rolling apparatus with the rolls 8 serving as rolling rolls. The rolls 8 are positioned in upper and lower rows and a steel material 10 is rolled between the upper and lower rows of the rolls 8 as it is transported along a transport path defined between the upper and lower rows of the rolls 8. The machine system constituents 9 are provided for each of the upper and lower rows with the neighboring rolls 8 constituting a single machine system constituent 9. Where the machine system 2 is constituted by the plural machine system constituents 9 such as described above, the determining units 4 are provided one for each of the machine system constituents 9, and the sensors 3 connected with each determining unit 4 are positioned one for each of the machine components 1 of the associated machine system constituent 9.

Figure 3:
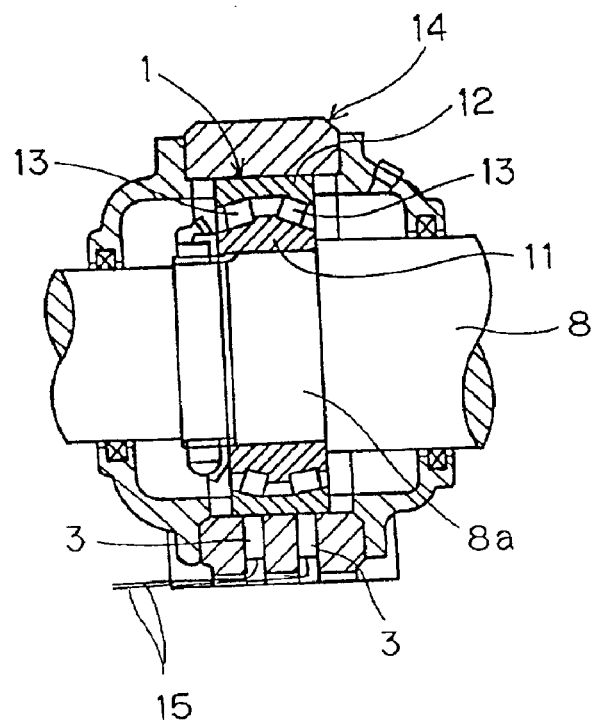
FIG. 3 is a sectional view showing a relationship between the machine components and the sensors used in the machine system shown in FIG. 2.

Each of the machine components 1 in the form of the rolling bearings includes, as shown in FIG. 3, an inner race 11, an outer race 12 and a plurality of rolling elements 13 retained by a retainer (not shown) and interposed between the inner and outer races 11 and 12. In the illustrated example, each machine component 1 is a double row bearing, more specifically, a double row aligned roller bearing. Each machine component 1 in the form of a rolling bearing has the outer race 12 fixed to a housing 14 and the inner race 11 mounted on a roll shaft 8a of the respective roll 8.

Each of the sensors 3 detects, and outputs a sensor signal indicative of any influence brought about by passage of the rolling elements 13 in the respective machine component 1, for example, a change in strain, load, or vibration or the like induced at a predetermined location of the respective machine component 1. In the practice of the present invention, for each of the sensors 3, any sensor may suffice provided that it can detect an influence signal that may bring about a defective signal in a passage signal of the rolling elements 13. By way of example, each sensor 3 may be employed in the form of a piezoelectric sensor, an optical displacement sensor, or a strain gauge, but in the illustrated embodiment the piezoelectric sensor is shown as being employed for each sensor 3.

Each sensor 3 is fitted to the associated machine component 1. Where each machine component 1 is a rolling bearing of which the inner race is rotatable, the associated sensor 3 is mounted on an outer diametric surface of the outer race 12. Also, where each machine component 1 is a double row bearing, each sensor 3 is installed for each row as shown in FIG. 3. Wiring 15 from each sensor 3 extends within a cutout groove or the like in the housing 14, and extends out of the housing 14. The wiring 15 connected with each sensor 3 is preferably employed in the form of a sensor cable having a protective sheath that is water-proof, dust proof, rust proof, moisture proof, oil resistant, heat resistant, and resistant to electromagnetic noises.

Referring to FIG. 1, the determining units 4 are disposed in the vicinity of the machine system 2 and are accordingly located within a machine room 16 in a plant where the machine system 2 is installed. The control units 5 is located within a monitoring room 17, which may be at a location remote from the machine room 16 in the plant, or within the machine room 16 if so desired. Where the control units 5 comprises the dedicated controller 6 and the general purpose information processing device 7, the controller 6 may be installed within the machine room 16 and the information processing device 7 may in such case be installed within the monitoring room 17.

Figure 4:
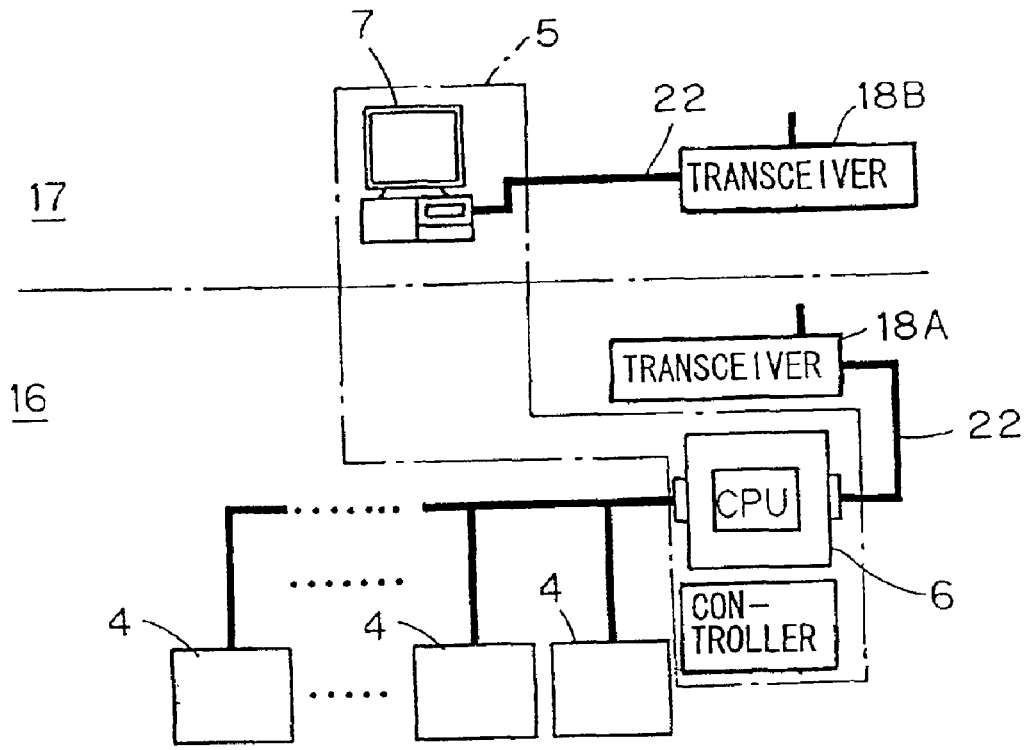
FIG. 4 is an explanatory diagram showing an example in which wireless transceivers are used in the monitoring system shown in FIG. 2.
Figure 5:
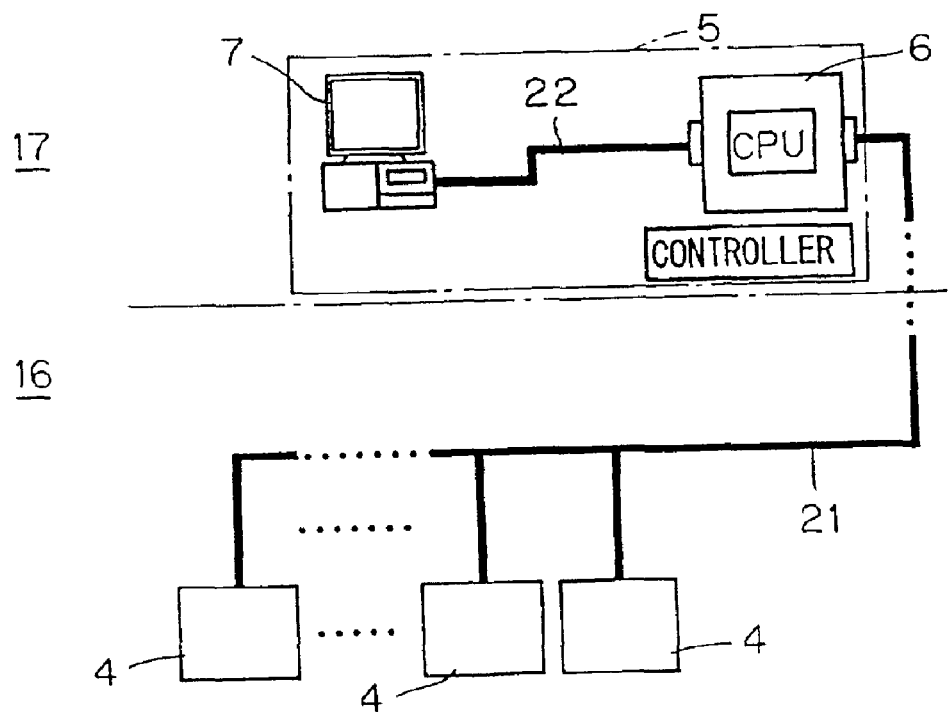
FIG. 5 is an explanatory diagram showing an example of a cable connection of the monitoring system shown in FIG. 2.

Each of the determining units 4 has relay terminals 20a and 20b, and these determining units 4 are sequentially connected with the controller 6 through the relay terminals 20a and 20b. The relay terminals 20a and 20b are connected with each other, and each of these relay terminals 20a and 20b has a signal and power terminal portions (not shown). For wiring 21 used to connect the determining units 4 with each other and also to connect the determining unit 4 with the controller 6, a device network cable is employed. The device network cable is generally known as a cable used to connect appliances for bus communication and, at the same time, to supply an electric power among the appliances. This wiring 21 is used in the form of a bus system allowing a plurality of appliances to share a common transmission line. The use of the bus system makes it possible to minimize the number of transmission lines. More specifically, a half duplex transmission system such as, for example, RS485 is used therefor. Although a full duplex transmission may be equally employable, the use of the half duplex transmission system is preferred, so that the number of the transmission lines can be minimized, and in view of the size of a load on transmission processing. device 7 is employed in the form of a serial transmission cable such as, for example, a standard RS-232C transmission cable. According to one aspect, the controller 6 and the information processing device 7 are connected with each other wirelessly using wireless transceivers 18A and 18B as shown in FIG. 4. The use of the wireless transceivers 18A and 18B enables the controller 6 and the information processing device 7 to be installed at respective locations separated from each other, that is, within the machine room 16 and the monitoring room 17, respectively. According to another aspect, FIG. 5 illustrates a system layout in which the controller 6 and the information processing device 7 are connected by means of the cable and are, hence, installed within the monitoring room 17.

Referring back to FIG. 1, a brief discussion will be made of the function of each of the determining units 4 and the control units 5. Each of the determining units 4 processes an output signal from each of the sensors 3 according to a processing set-up condition to determine the presence or absence of an abnormality in the waveform of the sensor signal. The processing set-up condition and a result of determination are accessed by a command from the control units 5 that is connected therewith through a bus line. In other words, the processing set-up condition is rewritten through a terminal of the control units and the result of determination is outputted through a terminal of the control units 5. The number of the determining units 4 that can be connected with the control units 5 is, for example, a few tens of units, and the determining units 4 are uniquely identified by respective IDs (identification information) each being set by setting a dip switch (not shown) mounted on a circuit substrate of each determining unit 4.

The controller 6 of the control units 5 makes use of a communication function to automatically collect statuses, abnormality information, and other information of each of the determining units 4 that are bus-connected therewith. The controller 6 is also connected with the information processing device 7 collecting the data, and performs a command processing by means of a terminal operation from the information processing device 7. Where the controller 6 is installed in the vicinity of the machine system 2, the controller 6 preferably has a water-proof and heat-resistant structure.

The information processing device 7 collects, through the controller 6, data on the sensor waveform acquired by each of the determining units 4. The collected data are processed through a general purpose processing application software and visualized. The information processing device 7 is started up only when the necessity arises to collect the data and also to make reconfirmation.

Figure 6:
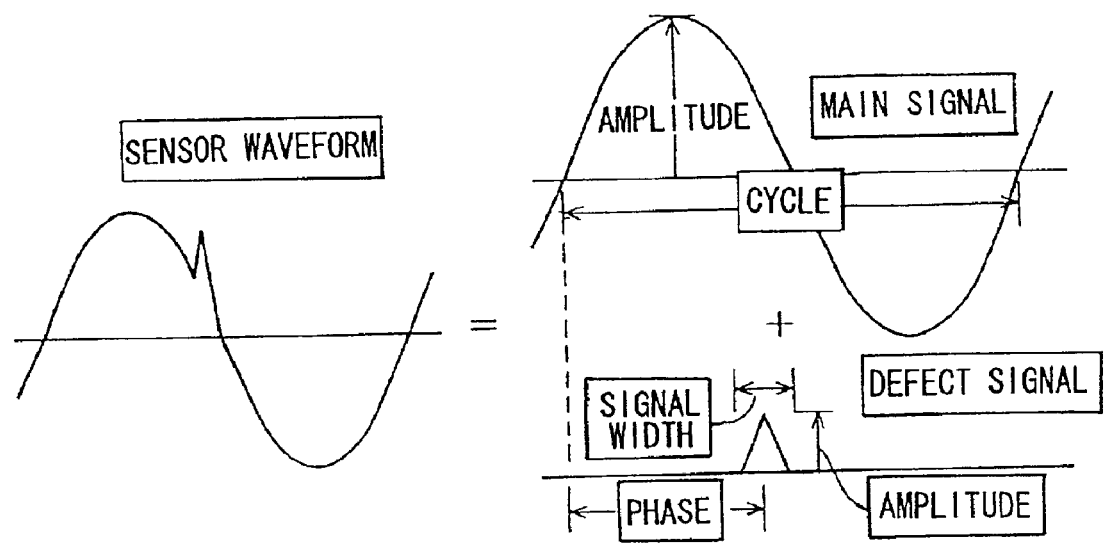
FIG. 6 is a diagram showing a sensor waveform.
Figure 7:
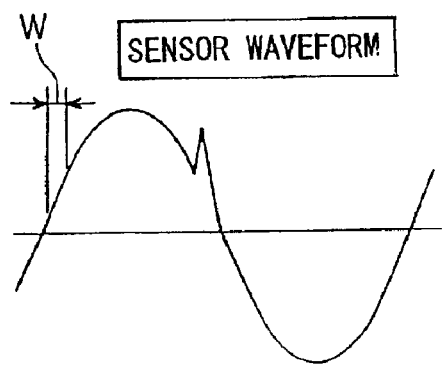
FIG. 7 is an explanatory diagram showing a relationship between the sensor waveform and a data extracting time interval of a non-linear filtering process.

Hereinafter, various component parts of the monitoring system will be discussed. In the first place, the sensor waveform will be described. The waveform of the output signal from each of the sensors 3 fitted to the machine component 1 is shown in FIG. 6. This sensor waveform contains a main signal and a defect signal. The main signal is a waveform that appears sinusoidally at a predetermined cycle incident to passage of the rolling elements. A high frequency noise component included in the sensor output signal will be considered as included in the main signal. The detect signal is a signal component other than the main signal that appears as a result of flaking on a rolling surface, and generally represents a waveform of a triangular spike. In other words, the sensor signal waveform corresponds to the waveform of the main signal superposed with the defect signal.

Figure 8:
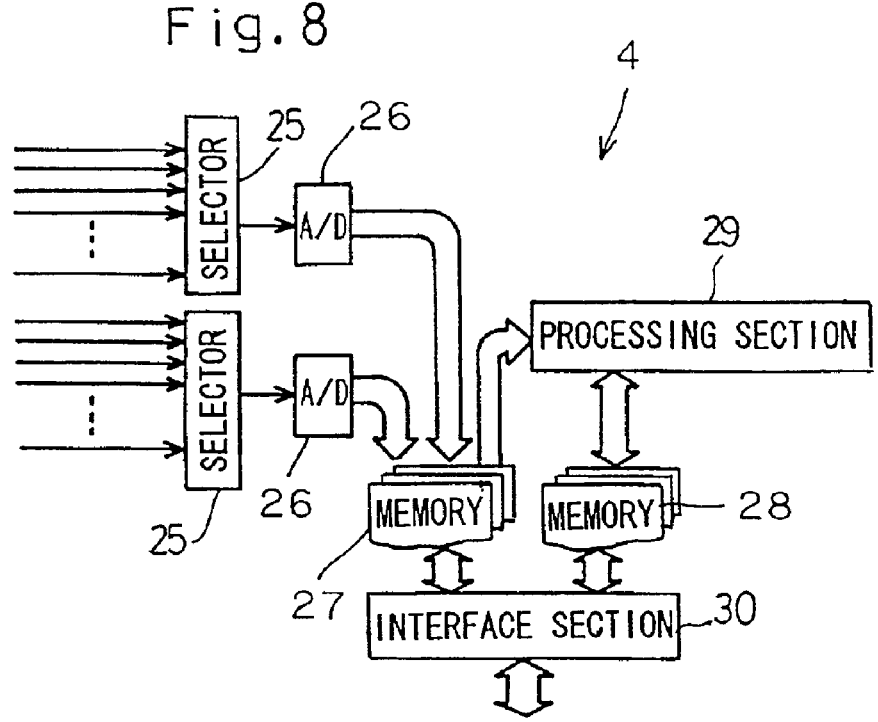
FIG. 8 is a block diagram showing a structure of determining units.

FIG. 8 illustrates the structure of each of the determining units 4. The respective determining unit 4 includes a selector 25 for sequentially selecting one of a plurality of sensor input channels, an analog-to-digital (A/D) converter 26 converting an output from the selector 25 into a digital waveform signal, a first memory 27 storing the digital waveform signal outputted from the AID converter 26, a processor 29 processing the waveform signal, stored in the first, memory 27, according to a set-up processing condition, that is, a predetermined condition, and also performing a predetermined determination according to a predefined range with respect to a result of waveform processing, a second memory 28 storing the result of waveform processing and the result of determination, both performed by the processor 29, and an interface unit 30 transmitting contents stored in the first and second memories 27 and 28 according to a request command (a kind of command) applied thereto from an external circuit.

The selector 25 is provided in a pair and the A/D converter 26 is employed for each of the selectors 25. Each of the selectors 25 has a plurality of, for example, eight, sensor input channels. The first and second memories 27 and 28 are respective storage areas that are logically divided in one and the same storage element such as, for example, a random access memory (RAM). The pair of the selectors 25 and 25 are so utilized that where the associated machine component 1 is in the form of the dual row bearing such as shown in FIG. 3, respective outputs from the sensors 3 and 3 one for each row can be inputted to one and the same channel of the paired selectors 25. In such case, the sensor waves from the sensors 3 and 3, one for each row, are stored in the first memory 27 correspondingly.

Each determining unit 4 causes the A/D converted waveform signal to be stored in the first memory 27 by sequentially switching one of the sensor input channels over to the other. The stored sensor waveform signals are processed as to the waveform according to the processing set-up condition and, in the event that the detect signal extracted is found to be out of the condition, the defect signal is treated as problematic. Also, by appropriately analyzing the command applied from the controller 6 (FIG. 1), internal statuses, abnormality information and the sensor waveform data are acknowledged to the controller 6 depending on the necessity.

Figure 9:
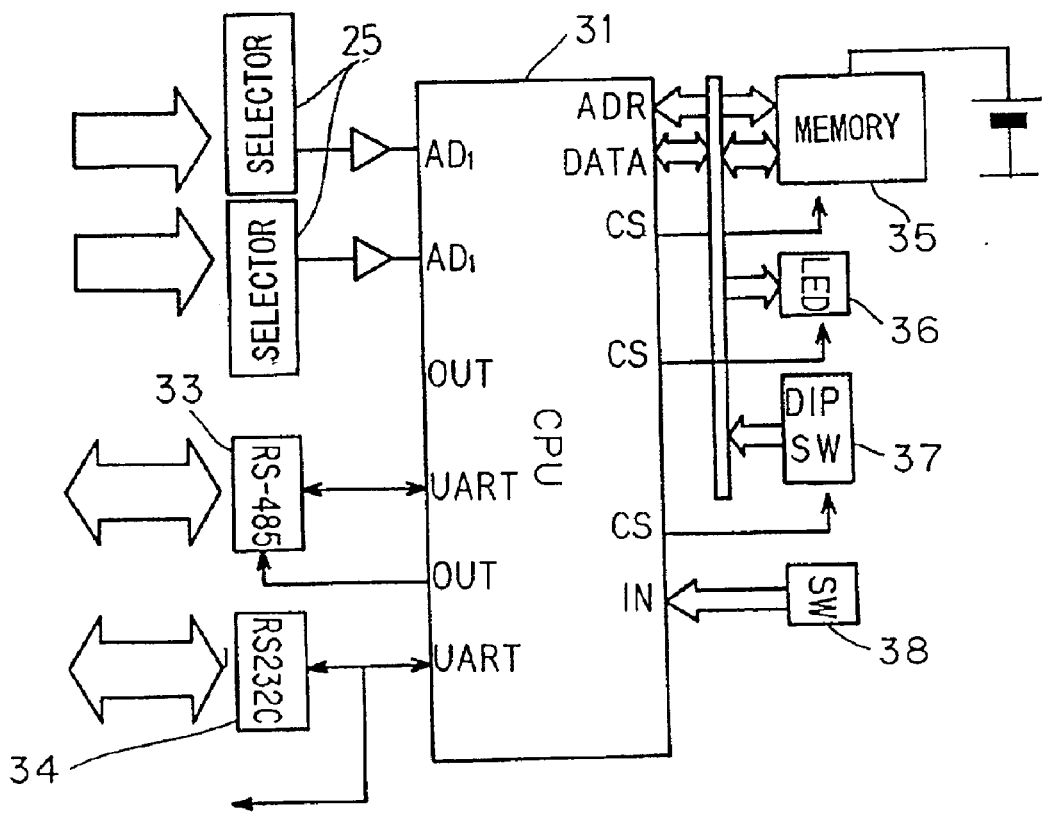
FIG. 9 is an explanatory diagram showing a hardware structure of each of the determining units.

Each of the determining units 4 is of a structure in which a central processing unit (CPU) chip 31 shown in FIG. 9 is mounted on a CPU board together with the selectors 25, interface elements 33 and 34, a memory element 35, a light emitting diode 36, a dip switch 37 and a switch 38. The CPU chip 31 includes the A/D converter 26 (FIG. 8). The memory element 35 constitutes the first and second memories 27 and 28 and is electrically powered and backed up by a battery cell. The light emitting diode 36 is used to provide an indication of a processing condition of the CPU. Also, each determining unit 4 is disposed by the rolling line and is, therefore, accommodated and sealed within a water-proof box together with water-proof electric connectors.

Figure 10:
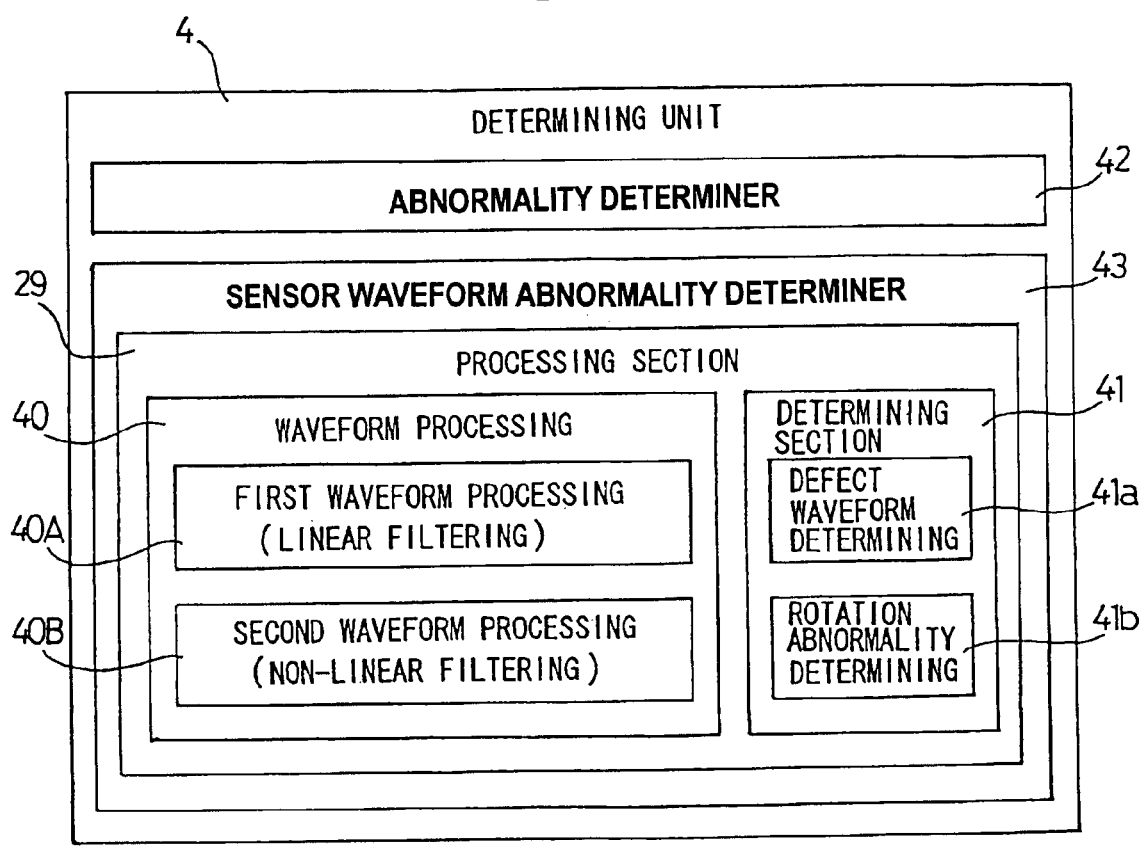
FIG. 10 is a block diagram showing a conceptual structure of each of the determining units.

As shown in FIG. 10, each determining unit 4 includes, as a part of the processor 29, a waveform processor 40 for the sensor waveforms, and a determining section 41 determining the presence or absence of an abnormality in the waveform processed by the waveform processor 40. The waveform processor 40 is provided with first and second waveform processors 40A and 40B processing the sensor waveforms using different waveform processing techniques, respectively. And selection of which one of the first and second waveform processors 40A and 40B is to be used is enabled by a selection command fed from the control units 5 (FIG. 1). Also, for each sensor 3 (FIG. 1), an arbitrary one of the first and second waveform processors 40A and 40B can be selected.

Each of the first and second waveform processors 40A and 40B is a filter extracting a component of the defect signal from the sensor waveforms. The first waveform processor 40A performs a linear filtering operation whereas the second waveform processor 40B performs a non-linear filtering operation. The determining section 41 determines the presence or absence of an abnormality by comparing the extracted defect signal with a predetermined predefined range.

The linear filtering operation referred to above is a process in which digital low pass filtering and high pass filtering are performed with respect to the digital data of the sensor waveforms, to extract the defect signal. The low pass filtering is used for the purpose of removing mainly a high frequency component, which is a noise component, whereas the high pass filtering is used for the purpose of removing the main signal component from the sensor waveforms. By using these two filters, only the detect signal component can be extracted. The amount of calculation increases in proportion to the number of orders of the digital filter.

The non-linear filtering operation referred to above is a process in which a process of extracting data of a predetermined time range W from a data stream of the sensor waveform and determining the difference between the maximum and minimum values of the extracted data is repeated by sequentially shifting the predetermined time range W, to thereby extract the defect signal component. In other words, by setting a window of the time range for extraction of the data from the data stream, a maximum and minimum filtering process is performed within the window.

Thus, by determining the difference between the maximum and minimum values within the predetermined window, a variation component (corresponding mainly to the main signal in the instance now under discussion) that appears over a sufficiently long range by the window length and any possible influence brought about by a variation component (corresponding to the high frequency noise component in the instance now under discussion) that appears over a short range can be relieved.

Since the difference between the maximum and minimum values is determined, a positive value can be obtained regardless of the polarity of the defect signal. While the linear filtering technique functions according to the design of filtering characteristics, a signal frequency component removed by the data extraction window length can vary qualitatively. The amount of calculation depends on maximum and minimum value calculating algorisms, but no product-sum operation is required and, therefore, it is superior to the linear filter.

Since the linear and non-linear filtering operations have their own merits and demerits, the use of the waveform processors 40A and 40B capable of performing the linear and non-linear filtering processes, respectively, is preferred. Table 1 below illustrates comparison of the respective features of those filtering processes.

TABLE 1

| Technique | Linear Filtering | Non-Linear Filtering |
| --- | --- | --- |
| Features | Design of frequency region (Design Tools Available) Readily knowledgeable and easy to analyze. Severe design results in increase of the number of filtering orders Large amount of calculation (Product-sum operation) If improperly designed, the defect signal is removed too. | Designed by cut window length Due to non-linear processing, difficult in theoretical analysis. Amount of calculation tending to increase with increase of the cut length Positive output value Defect signal relatively easy to be extracted |
| Calculation Amount | Product-sum × Filtering Order No. | Comparison × Cut Length (Compressible) |

Results of simulation tests have indicated that as compared with the linear filtering technique, the non-linear filtering technique gives rise to a relatively large amplitude of the defect signal component. This appears to have resulted from the fact that in the linear filtering process, high frequency signal components as well as low frequency signal components, both included in the defect signal, are intercepted. This is a substantial phenomenon and is therefore unavoidable. On the other hand, with the non-linear filtering process, although an amplitude can be obtained, signal width information tends to be expanded. This is also a substantial phenomenon found in the non-linear filtering process and is therefore unavoidable.

Abnormalities detected by each of the determining units 4 will now be described. As shown in FIG. 10, each of the determining units 4 includes an abnormality determiner 42 and a sensor waveform abnormality determiner 43. The determiner abnormality determiner 42 is operable to determine the presence or absence of an abnormality resulting from the respective determiner itself whereas the sensor waveform abnormality determiner 42 is operable to detect the presence or absence of an abnormality resulting from the sensor waveform. The sensor waveform abnormality determiner 43 is constituted by the previously described waveform processor 40 and the determining section 41. Relations among types, states and causes of the abnormalities are tabulated in Table 2 below.

TABLE 2

| Types of Abnormalities | | States | Causes |
| --- | --- | --- | --- |
| Abnormality Determiner | Communication Abnormality | No response in a predetermined time to communication from the controller Response data abnormality and so on. | Connection NG ID Setting NG Noise Inclusion |
| | Parameter Abnormality | Improper initial value for the determining parameter setting data | Back-up Battery NG |
| | CPU Abnormality | CPU abnormality (Interruption Process NG and so on) | Software Bug |
| Sensor Waveform Abnormality Determiner | Rotation Abnormality | No specific sensor signal frequency detected Specific sensor signal frequency displaced | Sensor NG (Peel-off, Breakage, etc) Bearing Seizure |
| | Detection of Defect Waveform (1 to 3 stages) | Maximum defect signal value exceeding the standard value | Abnormality on the rolling surface |

The abnormality determiner may be classified into a communication abnormality (an abnormality occurring on the bus communication protocol), a parameter abnormality (improper data on processing conditions used in the wave signal processing), and a CPU abnormality (mainly software bugs such as resulting in interruption abnormality, system abnormality and so on). In the event of detection of the abnormality determiner, an electric power supply should be re-triggered on, and necessary remedies should be taken immediately after the phenomenon has again occurred.

The sensor waveform abnormality occurs when as a result of the data processing of the captured sensor waveform it is determined that the sensor waveform is problematic in any way. The sensor waveform abnormality determiner 43 provides an indication of an abnormal state only when the sensor waveform abnormality is repeatedly detected a number of times.

The sensor waveform abnormality includes a defect waveform abnormality and a rotation abnormality that are determined by a defect waveform abnormality determining section 41a and a rotation abnormality determining section 41b, respectively, both of which are provided in the determining section 41.

The defect waveform abnormality determining section 41a is operable to determine the presence of a defect waveform abnormality in the event that it is detected that the maximum value of the defect signal exceeded a threshold value consecutively through a plurality of cycles of determining operations. Neither the phase of the defect signal nor the signal width is taken into consideration. The threshold value is set in a plurality of kinds and, in the case of the three kinds of the threshold value available, they are set to respective values, which are equal to, two times, and four times a predetermined value.

Where the machine component 1 is a rolling bearing, the presence of a flaw on the rolling surface of the outer race 12 (FIG. 3) results in generation of strains as the rolling elements 13 pass successively over the flaw on the rolling surface and, therefore, a defect signal abnormality occurs. Although the exact position of the flaw appearing on the rolling surface of the outer race 12 with respect to a circumferential direction thereof can be determined by the phase of the defect signal, recognition of the phase is necessary where no location is required to be identified. In the case of the roll support bearings used in a continuous casting apparatus, of the component parts of each roll support bearings, since the outer race 12 is subjected to the severest condition of use and since the lowest point of the outer race 12 constitutes a factor of the lifetime thereof, positioning of the sensor 3 at the lowest point of the outer race is effective to facilitate an efficient detection of the presence of an abnormality.

The rotation abnormality determining section 41b performs a comparison with the other sensor main signal cycle connected with the associated determining unit 4, to determine the presence of a rotation abnormality in the event that the case in which the main signal cycle does not fall within the predefined range is detected a number of times consecutively. In the event that the main signal cycle of all of the sensor signals is out of the predefined range, it is determined that the line is not operated and a count for continuous number of times is cleared. The predefined range referred to above is determined by suitably determining an error component.

The main signal cycle is a cycle in which the rolling elements 13 move past the position of the associated sensor 3 and, therefore, if the machine component 1 is a bearing, it corresponds to the product of the number of rotations of the bearing multiplied by the number of the rolling elements 13. For this reason, by the detection of the rotation abnormality, the presence of an abnormality in the number of rotations of the bearing can be detected. In other words, by comparing the sensor waveforms of the machine components which ought to rotate the same number of rotations, one of the machine components 1 in which rotation is troubled can be detected. By way of example, with respect to the bearings supporting an array of rolls 8 lined up continuously, when the main signal cycle of the sensor waveform is compared, it can be determined that the rotation of the bearing is obstructed by any reason if the sensor waveform of only some of the sensors 3 show that the rotation is retarded. Also, even where the sensor waveforms of the bearings at the opposite ends of each of the rolls 8 or the bearings on respective rows of the double row bearings are compared with each other, the presence of a difference in the main signal cycles provides an indication that the bearing is obstructed for some reason.

The sequence of processing of each of the determining units 4 will now be described. The memory element (an extended memory) 35 shown in FIG. 9 stores therein a CPU error, a processing procedure, a processing condition, a result of measurement, a result of determination, and the captured sensor waveform data.

Figure 11:
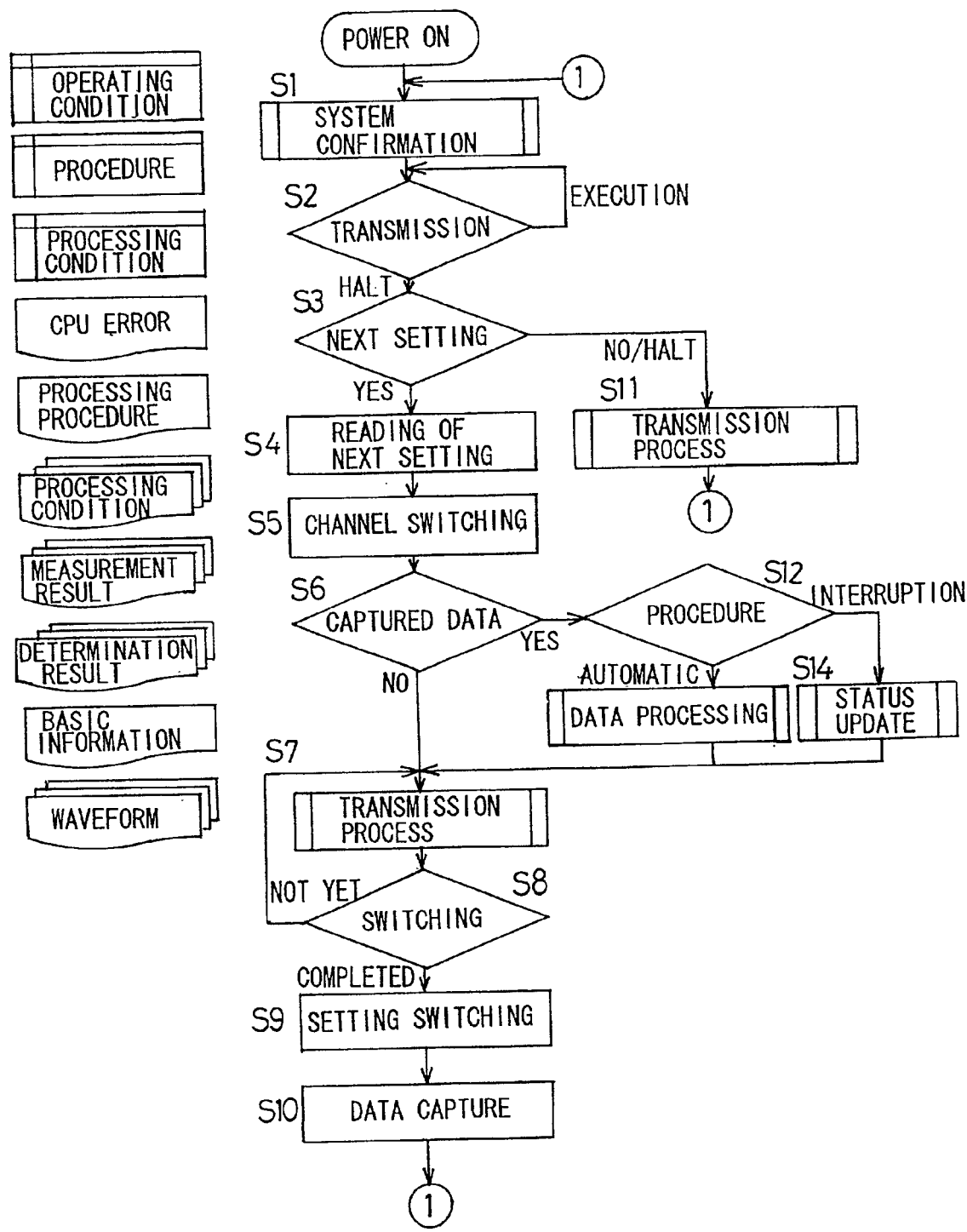
FIG. 11 is a flowchart showing the sequence of a process of determination performed by each of the determining units.

The sequence takes place as shown in a flowchart of FIG. 11. Briefly speaking, at the outset a channel switching for selection of the sensor waveform is carried out according to a setting (S5). After the channel switching, since a few seconds is required for the data level to be stabilized, a data processing of the sensor waveform captured in the memory is carried out during the interim period (S12). Thereafter, when the channel switching is fixed, processing parameters are updated and a data capturing process is executed (S10). During the data processing and the data capturing, a transmission processing is appropriately performed (S7) in readiness for analysis of the received commands and preparation of transmission data. In the event that the sensor waveform is requested by the control units 5, a data capturing process is registered in an interruption procedure, to enable interruption into an automatic processing procedure. Start and completion of the A/D conversion and communication with the bus run (buffer capture and sweeping) are performed during the interruption process (S14).

A method of controlling communication between the control units 5 shown in FIG. 1 and each of the determining units 4 will now be described. Where the control units 5 is made up of the controller 6 and the information processing device 7 as shown in FIG. 1, communication between the control units 5 and each of the determining units, which will now be described, is a control of communication between the controller 6 and each determining unit 4.

The communication system is a half duplex communication system. The control units 5 is used as a control station and each determining unit 4 is used as a slave station. The slave station cannot communicate unless instructed by the control station. The slave station merely responds to a transmission request sent thereto.

Figure 12:
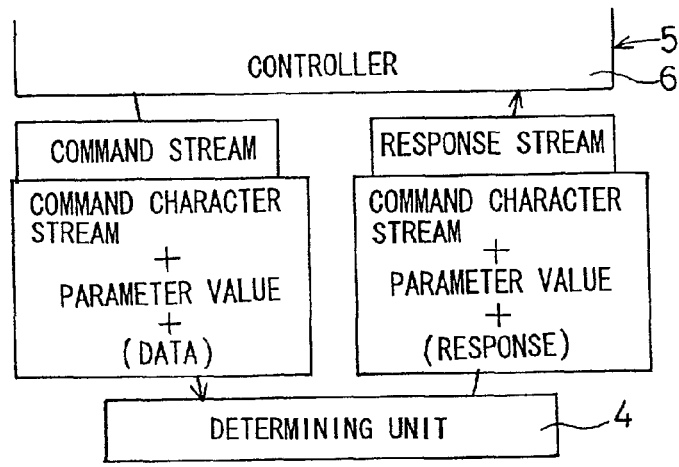
FIG. 12 is an explanatory diagram showing a communication conception of commands and responses between each of the determining units and a control units.

The structure of the command and that of the response will now be described with reference to FIG. 12. A stream of commands supplied from the control units 5 to each determining unit 4 is made up of an array of command characters including a plurality of, for example, four alphabet characters, a parameter value (two-digit character) and, optionally, data. No data delimiter exists. On the other hand, a stream of responses supplied from each determining unit 4 to the control units 5 in response to the command stream is made up of the command character stream and the parameter values received and a response data if requested by the command stream. If the proper command stream is received, the response data corresponding to the command characters and the parameter values are returned. On the other hand, if a false command stream is received, a predetermined response data is returned.

Broadly, the command is classified into a basic command and a memory data transfer command. The basic command is of a kind used to query the status of each determining unit 4 or to change an operating state, and data are made up of, for example, a stream of ASCII characters ending with a NULL character. The memory data transfer command is of a kind used to transmit and receive the entire data stored in the memories 27 and 28 (FIG. 8) within a certain range, and the data transmitted and received are a binary data of a standard length. When the memory data transfer command is used, a procedure for the data analysis performed in the control units 5 may increase, but the command analyzing process performed in each of the determining units 4 is lessened and, therefore, the possibility of the processing operation of each determining unit 4 being hampered can be reduced. The basic command is available in various types as shown in Table 3 below. In this Table 3, the legends "Auto" and "Trm" represent respective commands that can be used during an automatic monitoring mode and a terminal operated mode, both of which will be described later.

TABLE 3

| Naming | Command | Parameter | Data | Response | Meaning | Operation |
| --- | --- | --- | --- | --- | --- | --- |
| Version | GVER | 00 | none | Version Character Stream | Acquisition of Software Version in Each Determining Unit | Auto/Trm |
| Process Status | GCND | 00 | none | Current Status Code[1] | Acquisition of Current Status | Auto/Trm |
| | SCND | Status Code | none | Preset Status Code | Setting of Current Status | Auto/Trm |
| CPU Error | GERR | 00 | none | Frequency of Occurrence of Errors | Acquisition of CPU Errors Occurred | Auto/Trm |

TABLE 3-continued

| Naming | Command | Parameter | Data | Response | Meaning | Operation |
|---|---|---|---|---|---|---|
| | GERR | Error No. (01–64) | none | CPU Error Code[2], Time of Occurrence | Error Code of Error No. | Trm |
| | SERR | −1 | none | Frequency of Errors Occurred(0) | Initialization of CPU Error Info. | Trm |
| Time | GCLK | 00 | none | Current Timing (min) | Extraction of CPU Time Info. | Trm |
| | SCLK | 01 | Time Setting Value (0–9999999) | Preset Time (min) | Setting of CPU Time Info. in unit of min.) | Trm |
| Determination Result | GALM | 00 | none | Determination Result NG Info.[3] | Acquisition of Presence or Absence of Determination Result NG Info. | Auto/Trm |
| | SALM | −1 | none | Result Response[4] | Initialization of Presence or Absence of Determination Result NG Info. | Trm |
| Measured Data | SMES | −1 | none | Result Response | Initialization of Measured Data on Set No | Trm |
| Determination Data | SRES | −1 | none | Result Response | Initialization of Determination Result Data on Set No. | Trm |
| Waveform Data | SWAV | Wave. No. (01–03) | Sensor No. ("1"–"16") | Result Response | Setting of Waveform Data Capture (Start acquisition immediately after ready) | Trm |
| | GWAV | 00 | none | Acquired Status Code | Acquisition of Status of Waveform Data Acquisition | Trm |

The memory transfer command is used to transmit and receive the date of the memories 27 and 28 in the form as presented. The data is binary.

The basic command is available in various types as shown in Table 4 below.

command, a start address, a terminating address, and a transmission start pointer value based on a memory address value separate from the transmitting and receiving buffer. The start and terminating address values are determined at a stage of the command analysis, or that of preparation of the

TABLE 4

| Naming | Command | Parameter | Data | Response | Data Capacity | Meaning | Operation |
|---|---|---|---|---|---|---|---|
| Processing Procedure | GSEQ | 00 | none | Processing Procedure | 128 Byte | Acquisition of Processing Procedure Data | Trm |
| | SSEQ | 01 | Processing Procedure | Result Response | 128 Byte | Setting of Processing Procedure Data | Trm |
| Inspection Data | GPRM | Set No. (01–32) | none | Inspection Data | 128 Byte | Acquisition of Inspection Data on Set No. | Trm |
| | SPRM | Set No. (01–32) | Inspection Data | Result Response | 128 Byte | Acquisition of Inspection Data on Set No | Trm |
| Measured Data | GMES | Set No. (01–32) | none | Measurement Result | 20 Byte | Acquisition of Measured Data on Set No | Trm |
| Determination Data | GRES | Set No. (01–32) | none | Determination Result | 64 Byte | Acquisition of Determination Data on Set No | Trm |
| Waveform Data | GWAV | Waveform No. (01–03) | none | Waveform Data | 120 Byte | Acquisition of Waveform Data | Trm |

Figure 13:
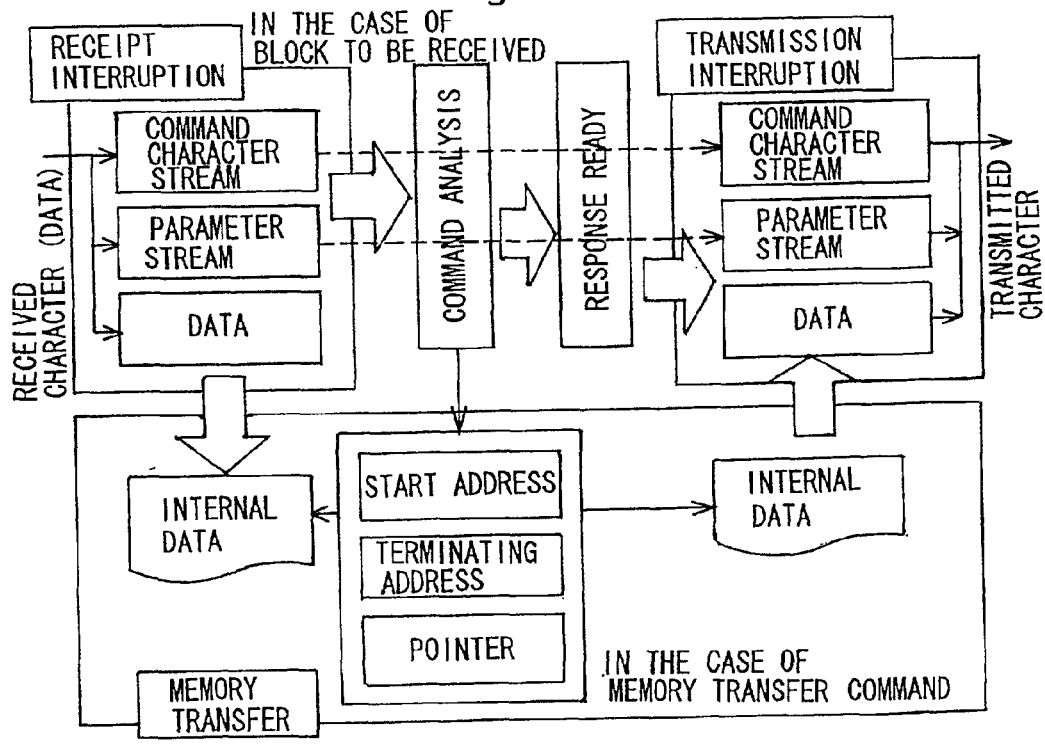
FIG. 13 is an explanatory diagram showing a conception of a processing of the commands and responses in the control units.

The manner in which the command stream and the response stream are stored will hereinafter be described. FIG. 13 illustrates a conception thereof. Since the command character stream (for example, 4 bytes) and the parameter stream (for example, two bytes) are of a fixed length, they are stored in a storage area separate from a transmitting and receiving buffer (not shown). The data and the response are basically passed through the transmitting and receiving buffer once and, even when the communication is not good, care is taken that they will not adversely affect the other processes.

In the case of the basic command, since the data and the response do not exceed a transmitting and receiving buffer length, all of them are temporarily stored in the transmitting and receiving buffer and, after it has been confirmed that the transmitting process has been performed properly, the data (response) is accommodated.

On the other hand, the memory transfer command calculates and stores, in addition to the procedure of the basic response. This is because it may be necessary to perform a DMA transfer. Also, where the data (response) is larger than a single transfer block length, an internal data transfer is carried out with due regard paid to the case in which communication is interrupted halfway.

The control units 5 shown in FIG. 1 will now be described. The control units includes, as hereinbefore described, the controller 6 connected with a bus line to communicate with each of the determining units 4, and the information processing device 7 connected with the controller 6 through a serial data transmission line for collecting data. The controller 6 issues the previously described command to the determining units 4 and performs the parameter setting for each of the determining units 4 and capture of response-based information from each of the determining units 4.

Figure 14A:
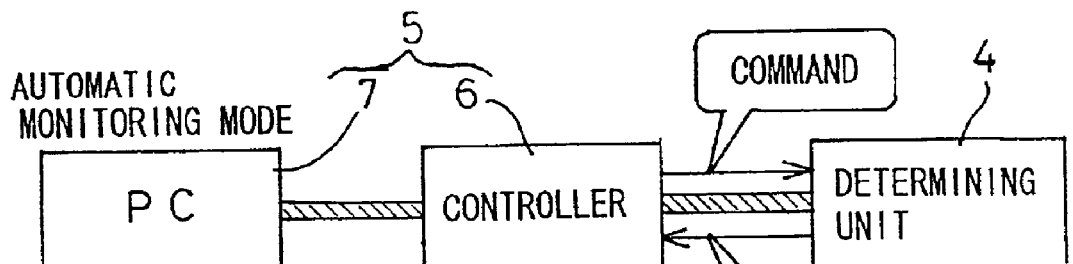
FIG. 14A is a conceptual diagram showing an automatic monitoring mode of the controller.
Figure 14B:
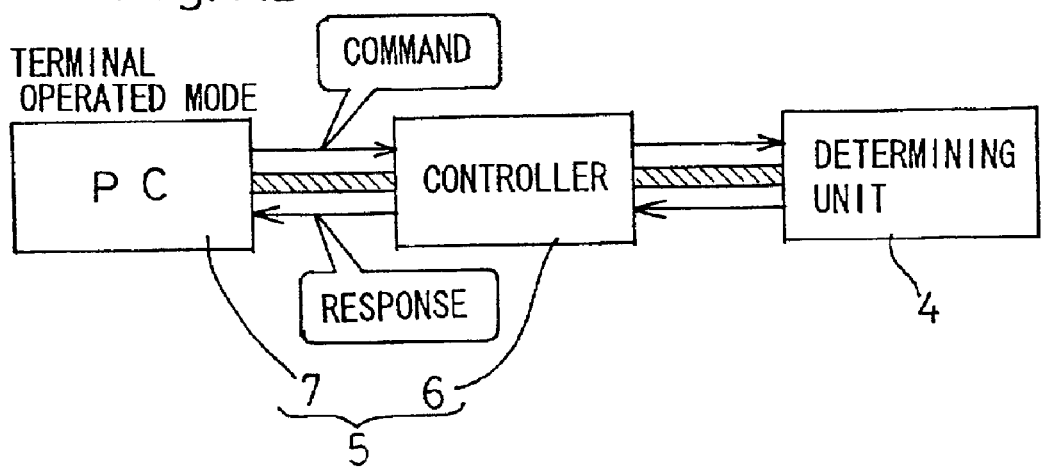
FIG. 14B is a conceptual diagram showing a terminal operated mode of the controller.

The control units 5 has two modes, namely, the automatic monitoring mode and the terminal-operated mode. FIGS. 14A and 14B illustrate explanatory diagrams showing the automatic monitoring mode and the terminal-operated mode, respectively.

The automatic monitoring mode is a mode during which a request for transmission of a result of determination is sequentially issued to each of the determining units 4 and the result of determination is acquired from each of the determining units 4. Abnormality information is at all times collected by the controller 6 during this automatic monitoring mode.

The terminal-operated mode is a mode during which a request for transmission of the result of determination and information other than the result of determination is made to each of the determining units 4 and a response thereto is subsequently acquired. In other words, an arbitrary command is issued from the information processing device 7 and the issued command is sent to each of the determining units 4 through the controller 6 and then, optionally, through the bus line so that the response thereto can be acquired. Collection of the waveform data is carried out during this terminal-operated mode.

The controller 6 will now be described with reference to FIGS. 15 to 17A and 17B. The controller 6 is operable to ascertain the operating state of each of the determining units 4, connected therewith through a bus line, by automatically issuing a command, so that the presence or absence of abnormality information can be collected therefrom. In the event of the presence of an abnormality, an abnormality display unit (for example, a light emitting diode) 63a briefly provides a visual indication of the presence of such abnormality. The controller 6 is also operable to convert a command instruction from the information processing device 7, connected serially therewith, into a form suitable for half duplex communication depending on the necessity and to exchange the data of each determining unit 4 with the information processing device 7.

Figure 16:
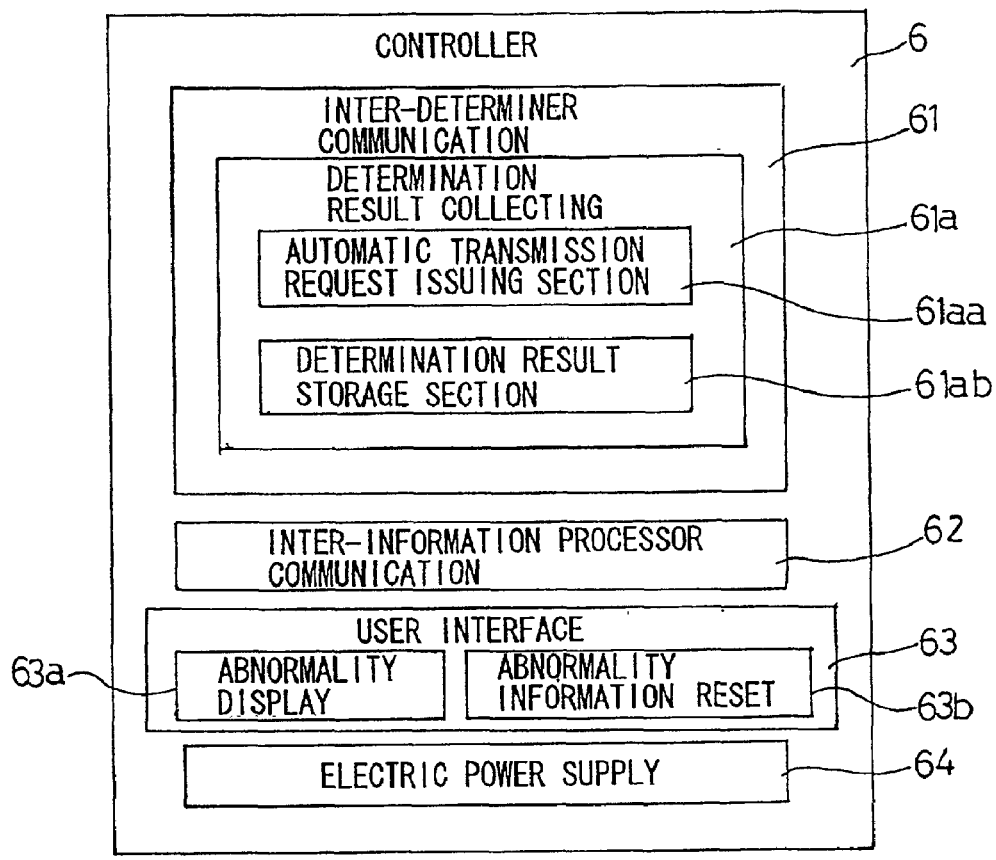
FIG. 16 is a block diagram showing a conceptual structure of the controller.

In other words, as shown in FIG. 16, the controller 6 includes an determiner communicator 61 communicating with each of the determining units 4, processor communicator 62 communicating with the information processing device 7, a user interface 63, and an electric power supply 64.

The determiner communicator 61 represents a device communicating between each of the determining units 4 and the controller 6. This determiner communicator 61 performs, for example, a process of automatically ascertaining the operating state of each determining unit 4 (that is, collection of the abnormality information) and a process of acknowledging the presence of an abnormality in one or some of the determining units 4. Specifically, the determiner communicator 61 is provided with a determination result collector 61a automatically collecting results of determination. The determination result collector 61a includes an automatic transmission request generating section 61aa automatically issuing a transmission request to each of the determining units 4 by polling as hereinbefore described, and a determination result storage section 61ab storing results of determination responses.

The processor communicator 62 represents a device communicating between the controller 6 and the information processing device 7. This processor communicator 62 performs, for example, a process of acknowledging the state of the controller 6 (processing of a controller dedicated command and responses) and a process of transferring to each of the determining units 4 (conversion of commands and protocol conversion).

Figure 15:
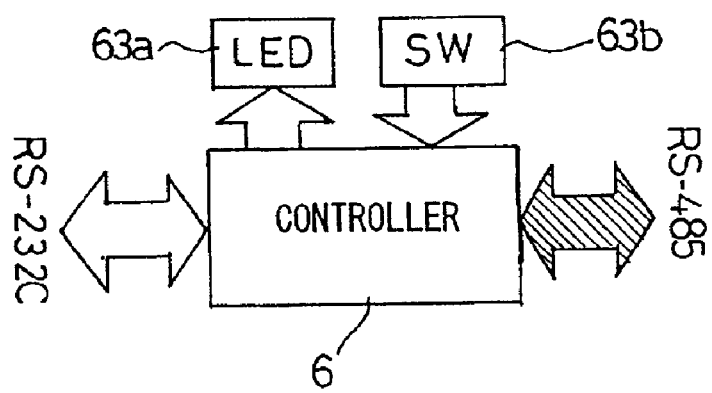
FIG. 15 is an explanatory diagram showing a schematic structure of the controller.

The user interface 63 is a simplified user interface such as, for example, an abnormality information reset 63b and an abnormality display 63a. The abnormality information reset 63b is made up of a switch as shown in FIG. 15.

The electric power supply 64 is made up of a built-in electric power unit and is operable to supply an electric power to the bus line.

Figure 17A:
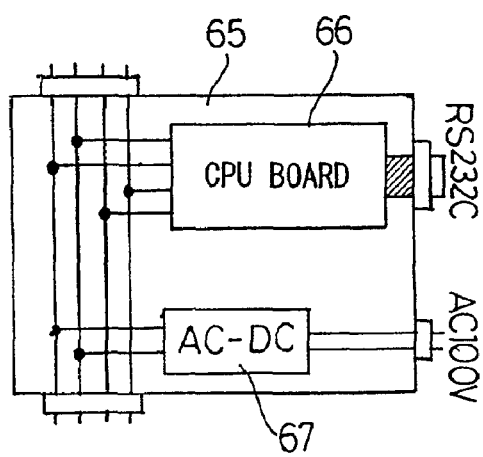
FIG. 17A is a diagram showing a hardware structure applicable where the controller is installed in a monitoring room.
Figure 17B:
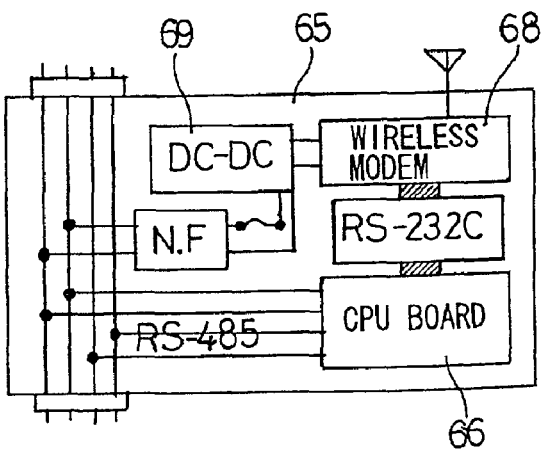
FIG. 17B is a diagram showing the hardware structure applicable where the controller is installed in a plant.

A block diagram of the internal hardware structure of the controller 6 is available in two type as shown in FIGS. 17A and 17B that are used one at a time.

FIG. 17A is applicable where the controller 6 is located within the monitoring room 17 (hence, with no wireless zone), and the controller 6 in this case shown therein includes a casing 65 in which a CPU board 66, an AC-DC converter 67 and terminals for bus lines, serial transmission and commercial power lines.

FIG. 17B is applicable where the controller 6 is located within the machine room 16 of the plant, and the controller 6 in this case shown therein includes, in place of the serial transmission terminal used in FIG. 17A, a wireless modem 68 and DC-DC converter 69 providing a power source therefor. In the example shown in FIG. 17B, the AC-DC converter 67 and the AC power source terminal both shown in FIG. 17A, are not illustrated for the sake of brevity.

Communication between the controller 6 and each of the determining units 4 is carried out according to the half duplex system stipulated in the RS485 standards. Specifically, the controller 6 communicates with each of the determining units 4, that are connected with the bus line, on a 1:1 basis, using the communication procedure described above, for automatically collecting the state of processing performed thereby and the abnormality information. As a result thereof, in the event of the presence of an abnormality in one or some of the determining units 4 and/or the controller 6 itself, it is acknowledged by means of the abnormality display unit 63a (FIG. 15) such as, for example, a light emitting diode.

More specifically, the determining units 4 that are connected with the bus line are registered in the controller 6 beforehand. The controller 6 then automatically issues a query command according to the registration information, sequentially, to the determining units 4, to query about the status thereof, and grasps the respective statuses of the determining units 4. Also, in the event that the command to each of the determining units 4 is inputted from the information processing device 7, the automatic processing is temporarily interrupted and, instead, a process of delivery is performed.

Communication between the controller 6 and the information processing device 7 is carried out according to a serial transmission communication protocol (RS-232C). The command inputted to the controller 6, which is outputted from the information processing device 7, includes a command to each of the determining units 4, and a controller dedicated command. The command inputted to the controller 6 is available in various types, as is shown in Table 5 below. Of the various types, a processing status command and a connection determining command are the controller dedicated command.

TABLE 5

| Naming | Command | Parameter | Data | Response | Meaning |
| --- | --- | --- | --- | --- | --- |
| Version | GVER | 00 | None | Version Character Stream | Acquisition of Controller Software Version |
| Processing Status | GCND | 00 | None | Current Status Code[1] | Acquisition of Processing Status |
| | SCND | Status Code (00–36) | None | Presetting Status Code | Setting of Processing Status |
| CPU Error | GERR | 00 | None | Frequency of Error Occurrence | Acquisition of Total Frequency of CPU Errors Occurred |
| | GERR | Error No. (01–64) | None | CPU Error Code[2] Time of Occurrence | Error Code of Error No. |
| | SERR | −1 | None | Frequency of Error Occurrence (0) | Initialization of CPU Error Info. |
| Time | GCLK | 00 | None | Current Time (min) | Acquisition of CPU Time Info. |
| | SCLK | 01 | Time Setting Value (0–9999999) | Set Time (min) | Setting of CPU Time Info. (in unit of min) |
| Connected Determining Unit | GCON | 00 | None | Connected Determining Unit Code[3] | Acquisition of Connected Determining Unit Info. |
| | SCON | 01 | Connected Determining Unit Code | Preset Connected Determining Unit Code | Setting of Connected Determining Unit Info. |
| Abnormality Information | GALM | 00 | None | Info. On Presence or Absence of Determination Result[4] | Acquisition of Presence or Absence of Collected Determining Result NG |
| | SALM | −1 | None | Result Response[5] | Initialization of Info. on Presence or Absence of Determination Result NG |

Referring again to FIG. 1, the information processing device 7 is connected with the controller 6 through a serial transmission cable. The information processing device 7 collects, depending on the necessity, waveform data by the terminal operated mode, during which it communicates with each of the determining units 4. Information about the operating states of the determiner units 4 and the controller 6, and the presence or absence of an abnormality in one or some of the determining units 4 and the controller 6 are also collected by the utilization of the command.

The manner in which the data are accumulated by the information processing device 7 will be described. Collection of the waveform data can be best accomplished if a personal computer is used. This is because the sensor waveform data acquired by each of the determining units 4 can be acquired in a digital data form and because a relatively large quantity of data can easily be collected from a filing device.

The most important merit that can be obtained when the personal computer is used for the information processing device 7 collector lies in that the numerical (digital) data of the sensor waveform captured in each of the determining units 4 can be collected directly as the numerical data. If the personal computer is used for the information processing device 7, since the date which each of the determining units 4 employs for the process of determination can be collected directly, not only can the same processes that are performed by each of the determining units 4 be reproduced on the information processing device 7, but a tuning test of the processing conditions can also be performed. Reproduction of the process can be accomplished by running a general purpose data processing application software such as, for example, a spreadsheet program.

Figure 18:
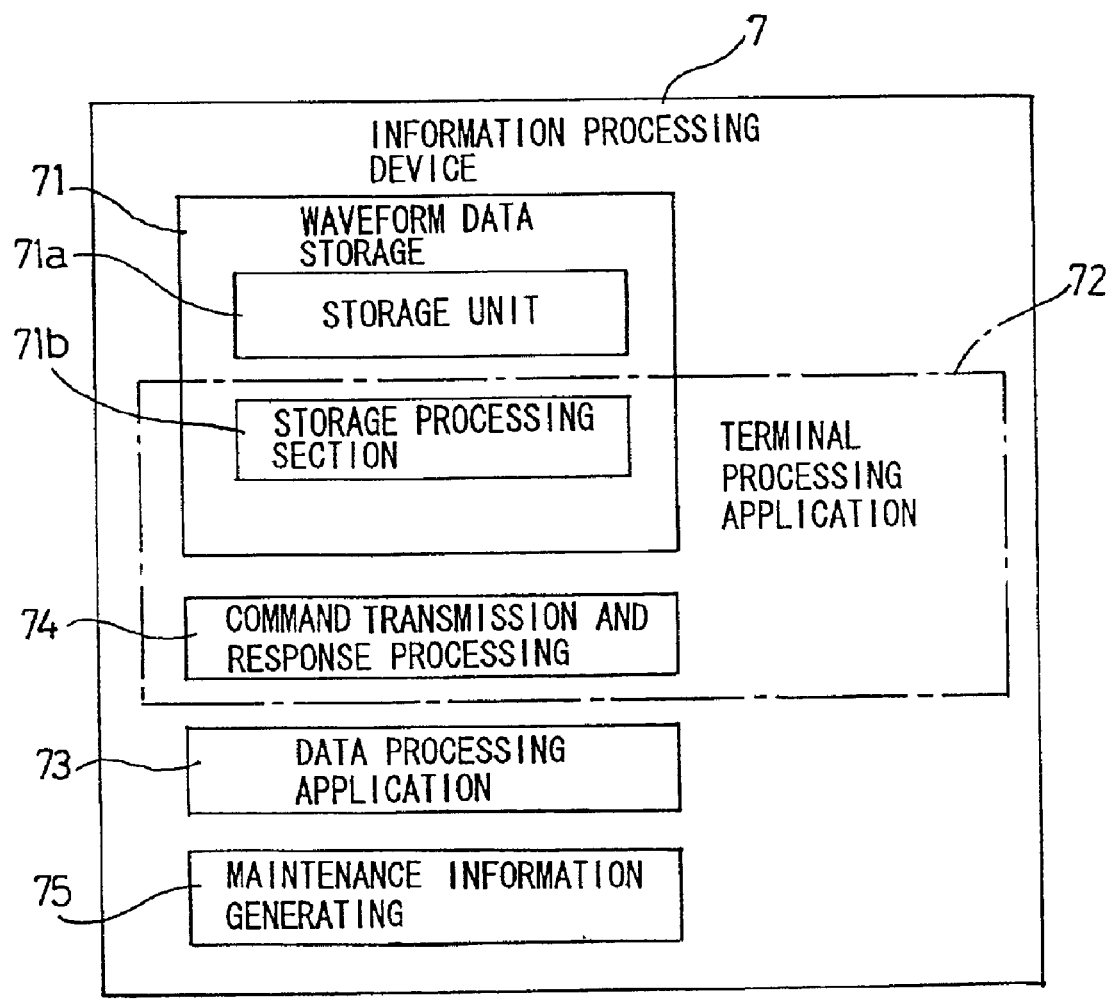
FIG. 18 is a block diagram showing a conceptual structure of an information processing device connected to the controller.
Figure 19:
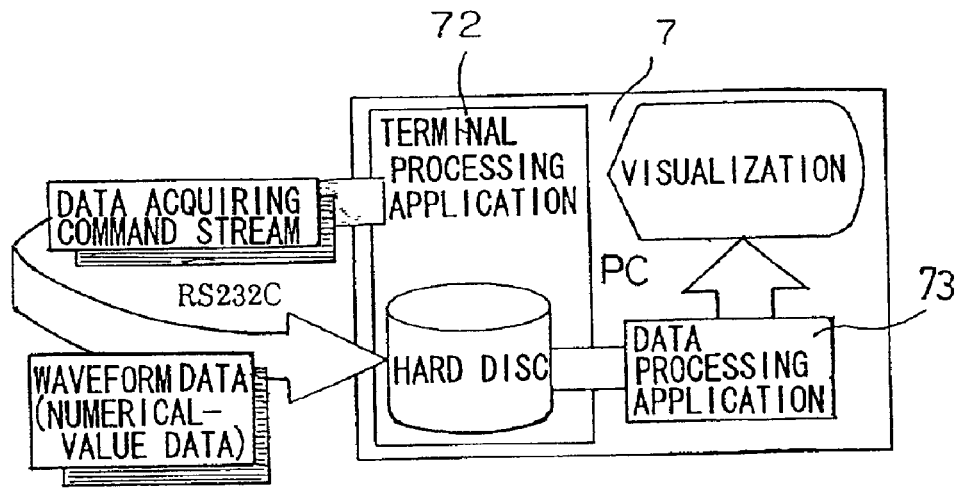
FIG. 19 is a conceptual diagram showing mainly a terminal executable application software in the information processing device.

The information processing device 7 includes, as shown in FIG. 18, a waveform data storage unit 71 storing sensor waveforms of the digital data captured by each of the determining units 4. This waveform data storage unit 71 is made up of a storage 71a for storing the sensor waveforms and a storage processor 71b for performing a process of storing. The storage processor 71b is a portion of a terminal processing application software 72 shown in FIG. 19. The terminal processing application software 72 makes it possible for the accumulated waveform data to be visualized through a data processing application software 73.

Figure 20:
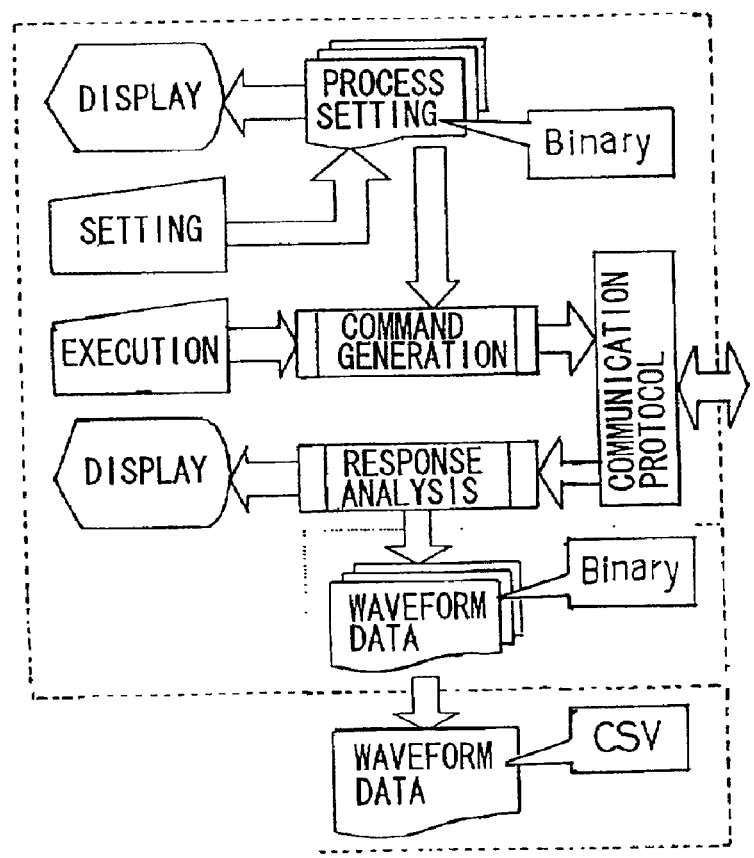
FIG. 20 is an explanatory diagram showing a specific example of a process performed by the terminal executable application software in the information processing device.

The terminal processing application software 72 is a program that issues a command to each of the determining units 4 and the controller 6 and then secures responses therefrom, and forms a command transmission/response processing unit 74. The transmission of the various commands referred to above and the response processing, both performed by the information processing device 7, are performed by the command transmission/response processing unit 74. FIG. 20 illustrates a conception of the process performed by the terminal processing application software 72. As hereinbefore discussed, the command includes the basic command and the memory transfer command, but in the case of the basic command, both the data and the response are a stream of characters and, therefore, a job of generating and analyzing the character stream is necessary. On the other hand, the memory transfer command deals with the binary data of the various settings of each the determining units 4 and those of the waveform, and therefore requires a job of compiling parameter values, displaying, and data conversion.

In addition, the information processing device 7 may be provided with a maintenance information generating unit 75 for to generate predetermined maintenance information associated with the machine components, based on the collected results of determination performed by each of the determining units 4. The maintenance information generated by the maintenance information generating unit 75 is associated with, for example, scheduling of the time of replacement of the machine components, the time of placing an order, and so on.

With the machine component monitoring system of the construction described hereinabove, monitoring of the statuses such as the presence or absence of an abnormality and the lifetime of each of the machine components 1, including the rolling elements, can be achieved with a simplified structure at a reduced cost, the monitoring can also be precisely and efficiently achieved.

In particular, in the structure according to the illustrated embodiment of the present invention, each of the determining units 4 operates independently to such an extent that the operating state of each determining unit 4 itself can be grasped, and/or the abnormality information of each of the machine components 1 can be grasped, and the sensor signals can be determined in such a way that a number of signals from the plural sensors 3 can be processed and the processing parameters can be changed. Also, with each of the determining units 4, by remote controlling through the control units 5, retrieval of the information and setting of the information can be accomplished. Also, each of the determining units 4 is of a water-proof, heat-resistant structure, and operates assuredly, and additionally, can easily be connected with a network and can easily be installed.

Figure 21:
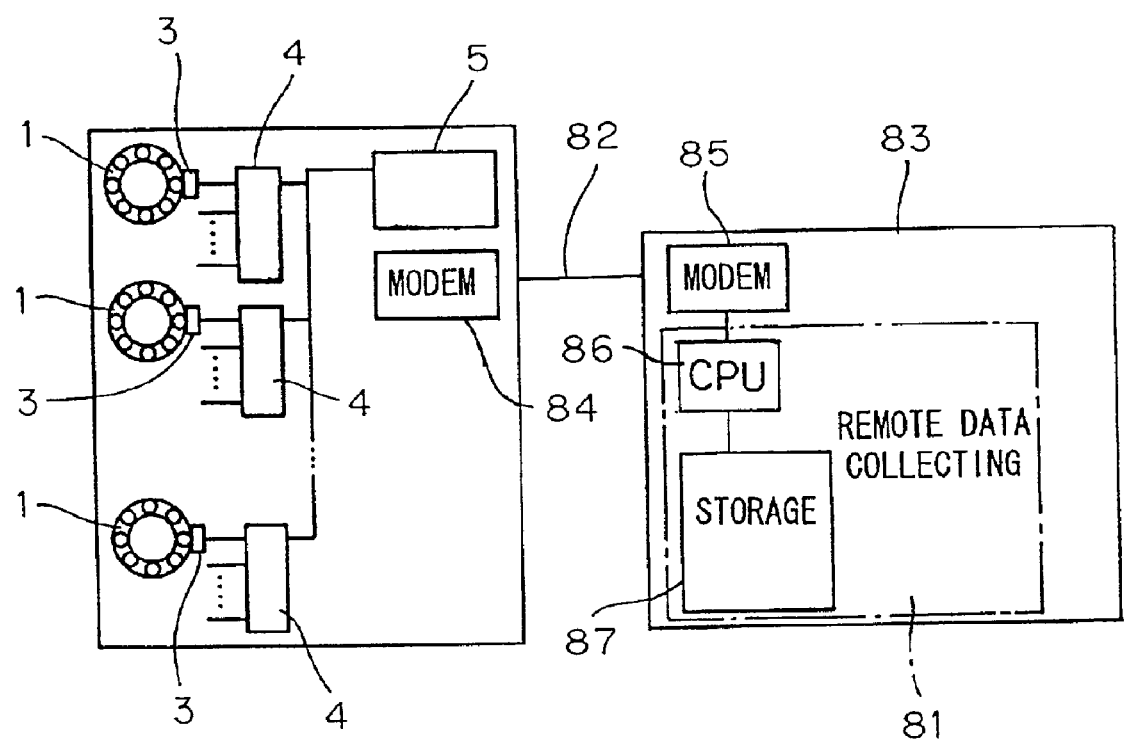
FIG. 21 is an explanatory diagram showing an example of development of the machine component monitoring system according to the embodiment of the present invention.

FIG. 21 illustrates an example in which the machine component monitoring system of the foregoing embodiment of the present invention has been developed and expanded to a different application. In this example, a remote data collector unit 81 is provided. In other words, at a location remote from the control units 5, there is provided an information processing unit 83 connected with the control units 5 through a communication network 82, and the remote data collector unit 81 is incorporated in this information processing unit 83. The control units 5 is capable of collecting not only the results of determination from the respective determining units 4, but also the sensor waveforms inputted to each of the determining units 4 in the manner described hereinabove. The information processing unit 83 located at a remote place may be either a personal computer or a general purpose mainframe computer, and includes a central processing unit (CPU) 86 and a storage unit 87. The remote data collector 81 collects the results of determination and the sensor waveforms, which the control units 5 has collected from each of the determining units 4, and comprises the central processing unit (CPU) 86, the storage unit 87 and a processing program (not shown). The communication network 82 may be, for example, a public telephone network, or a dedicated telephone network and connects between the control units 5 and the information processing unit 83 at the remote location by means of modems 84 and 85.

As hereinabove described, the use of the remote data collector 81 and the provision of the capability of collecting the determination results and the sensor waveforms at the remote location allows an expert servicing person of, for example, a manufacturer of the machine components, to perform a thorough analysis about the statuses and tendencies of the machine components.

In describing the foregoing embodiment, the description has been made where the machine components 1 to be monitored rolling bearings. But the machine components 1 to be monitored may be any machine component provided with rolling elements, for example, a constant speed joint or a ball screw mechanism, as will be described subsequently.

Figure 22:
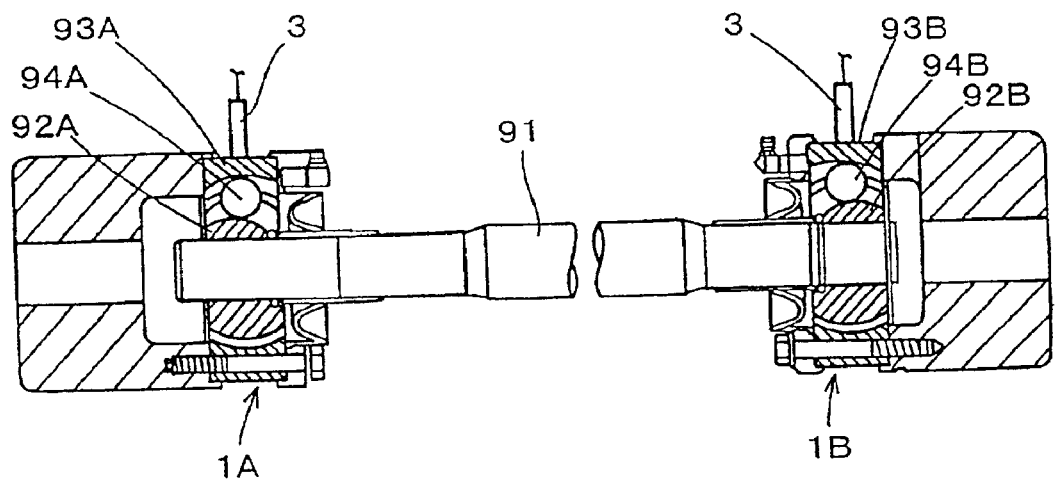
FIG. 22 is a sectional view of constant speed joints providing another example of the machine components to be monitored.

FIG. 22 illustrates the example in which the machine components 1 to be monitored comprise constant speed joints. The constant speed joints 1A and 1B which form the machine components 1 to be monitored, are disposed on respective opposite ends of a shaft 91, and each includes an inner race 92A and 92B, an outer race 93A and 93B, and a plurality of rolling elements 94A and 94B interposed between the inner and outer races. The sensors 3 are positioned in face to face relation with the outer races 93A and 93B, respectively.

Figure 23:
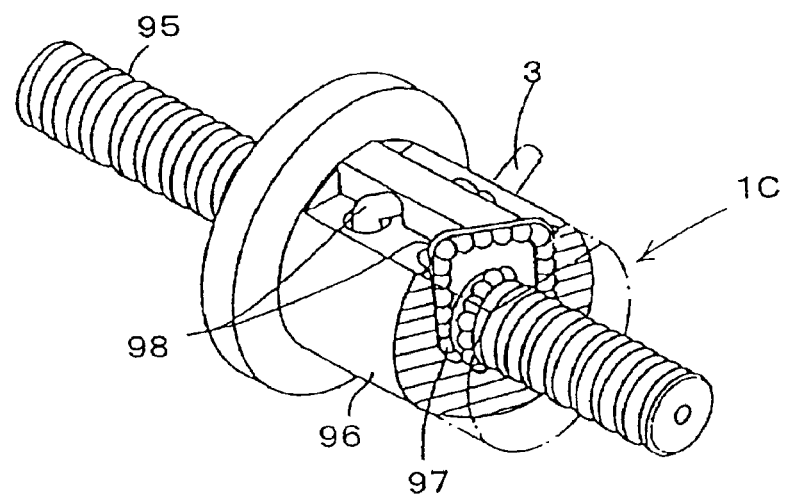
FIG. 23 is a sectional view of a ball screw mechanism providing a further example of the machine component to be monitored.

FIG. 23 illustrates the example in which the machine components 1 to be monitored comprise a ball screw mechanism 1C. The ball screw mechanism 1C forming the machine component 1 to be monitored includes a screw shaft 95, a nut 96 threadingly mounted on the screw shaft 95 and a plurality of rolling elements, for example, balls 97 interposed between the screw shaft 95 and the nut 96. The nut 96 has a circulating passage 98 defined therein for rolling circulation of the row of the rolling elements 97. The circulating passage 98 may be in the form of, for example, a return tube. The sensor 3 is positioned on and relative to the nut 96.

Figure 24:
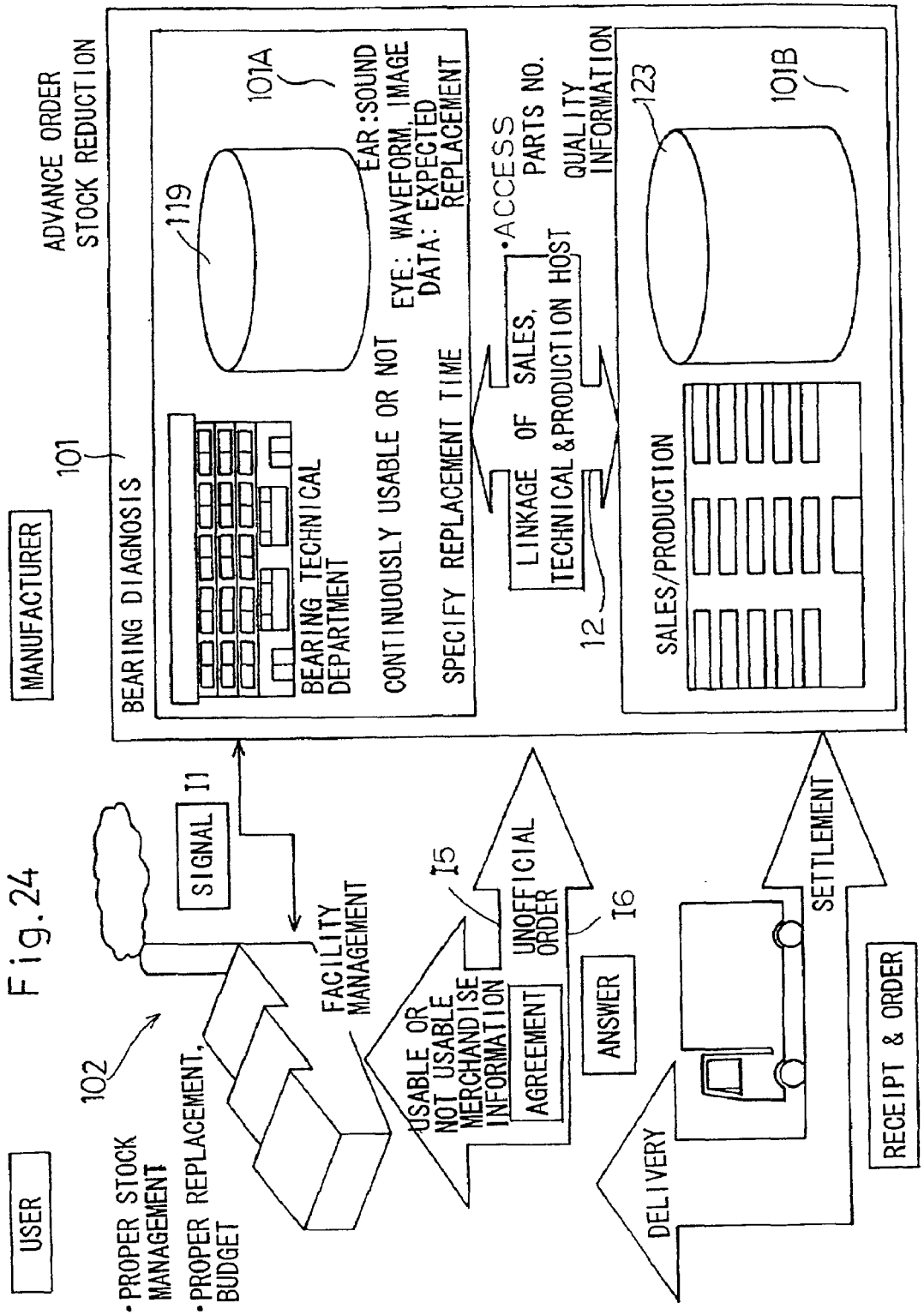
FIG. 24 is an explanatory diagram showing a genetic conception of one embodiment of a monitoring, diagnosing and selling system of the present invention.
Figure 25:
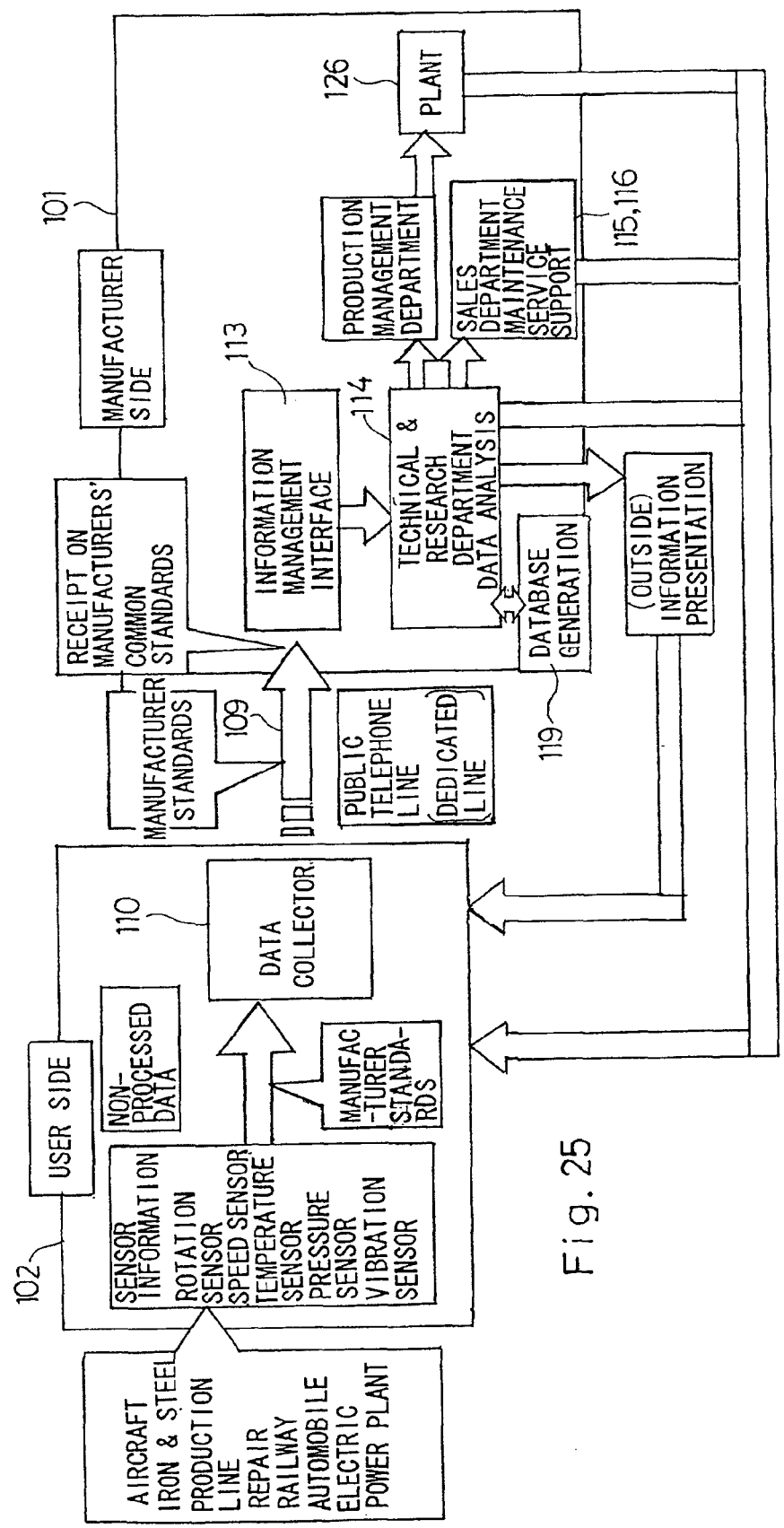
FIG. 25 is an explanatory diagram showing a medium conception of the monitoring, diagnosing and selling system.
Figure 26:
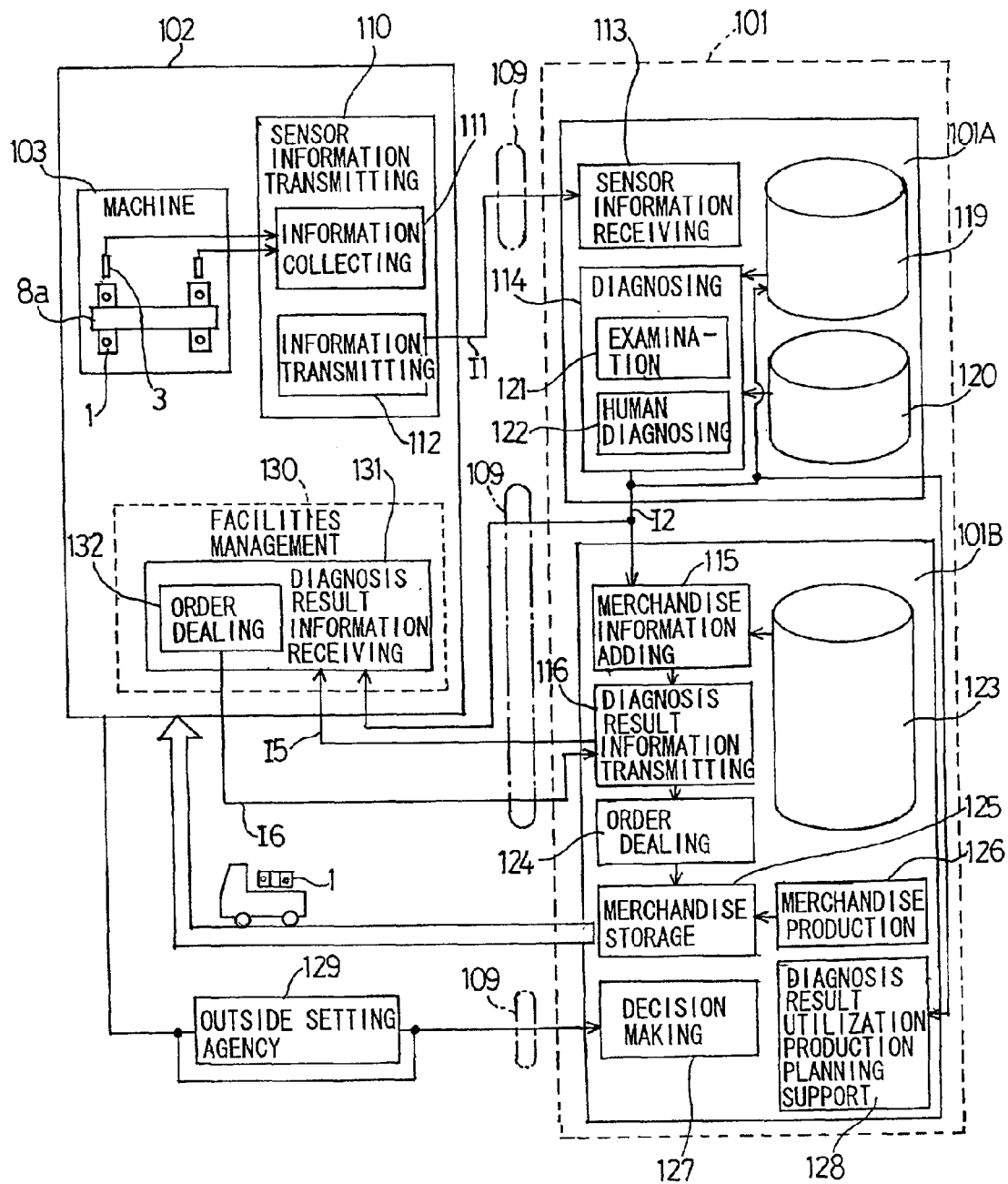
FIG. 26 is a block diagram showing a conceptual structure of the monitoring, diagnosing and selling system.

Hereinafter, a preferred embodiment of a monitoring, diagnosing and selling system according to the present invention will be described with particular reference to FIGS. 24 to 26. Of these figures, FIG. 24 illustrates a main conception of the system and FIG. 25 illustrates an explanatory diagram of a medium conception showing the flow of information among business establishments. FIG. 26 illustrates a block diagram showing a detailed conceptual structure of the present invention.

As shown in FIG. 26, the monitoring, diagnosing and selling system of the present invention is so designed and so configured that at a business establishment 101 of a corporation engaged in manufacturing and selling the machine components, monitoring and diagnosis are performed with respect to the machine components 1 used in a machine 103 installed at a business establishment 102 of a client corporation, and information on results of diagnosis is transmitted to the business establishment 102 of the client corporation together with merchandise information affixed thereto. The sensors 3 are to be installed relative to the machine components 1 to be monitored and diagnosed.

The machine component 1 to be monitored and diagnosed is provided with rolling elements, such as those used in a rolling bearing, a constant speed joint, a ball screw mechanism, or the like. The machine 103 referred to above utilizes the above described machine component 1, particularly a plurality of the machine components 1, and may be installed on production or servicing line of an iron and steel manufacturing plant, a paper manufacturing industry, or industries related to aircrafts, railways, automobiles or others. Alternatively, it may be any plant such as, for example, an electric power plant. The embodiment of the machine 103 herein referred to is intended to encompass a stand-alone machine and a production or servicing facility where a plurality of machines are installed. Also, the machine 103 may employ a plurality of shafts such as roll shafts, and the machine components 1 may be bearings for supporting those shafts.

Figure 32:
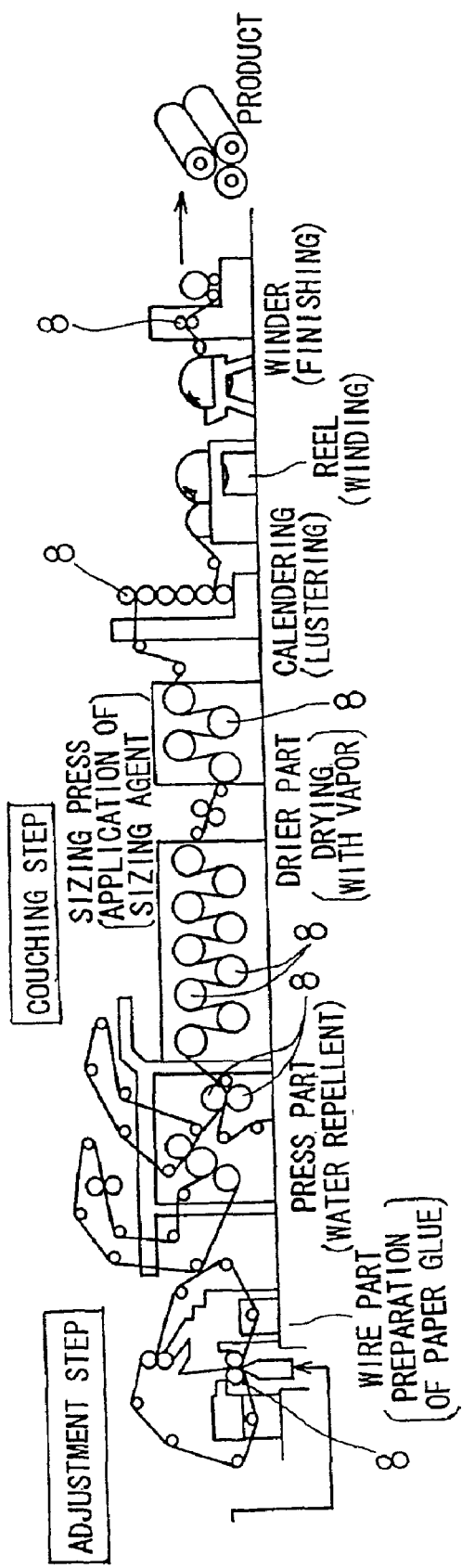
FIG. 32 is an explanatory diagram showing a structure of machines including the machine components to be monitored and diagnosed.
Figure 33:
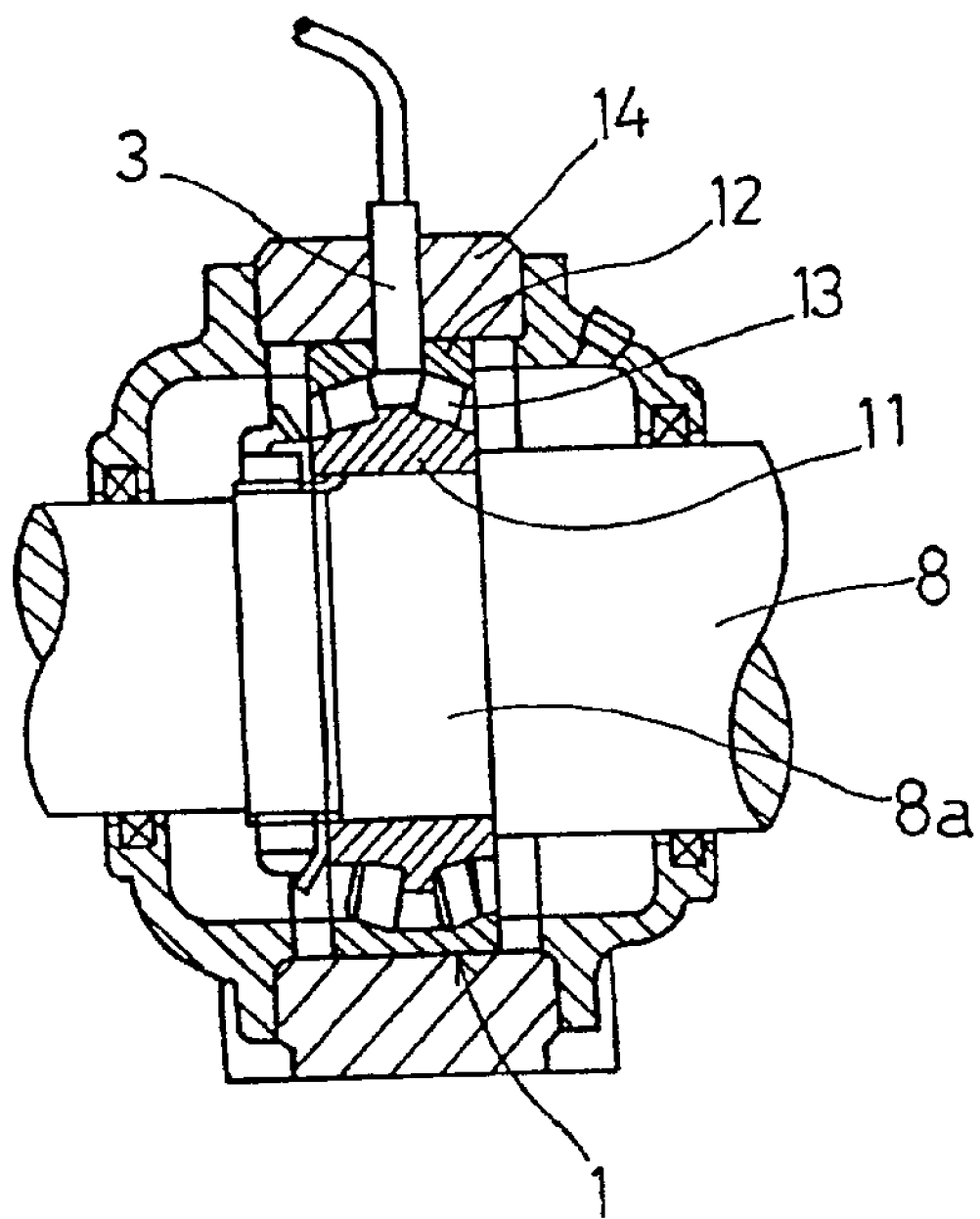
FIG. 33 is an explanatory diagram showing an example of arrangement of the sensors and the machine components to be monitored and diagnosed.

By way of example, where the machine 103 is a paper making machine, a plurality of rolls 8 are used by machines at various processing stations as shown in FIG. 32, and the machine components 1, which are represented by bearings each used to support a respective end of a roll shaft 8a of each of those rolls 8 (FIG. 33), is subject to monitoring and diagnosis. Each of these machine components 1 is a bearing including the inner race 11, the outer race 12 and the rolling element 13 interposed between the inner and outer races 11 and 12. The sensor 3 is, in the embodiment shown in FIG. 33, mounted on a housing 14 in which the machine component 1 comprised of the bearing is disposed.

As described in connection with the embodiment of the monitoring system, the machine component to be monitored may be a constant speed joint such as is shown in FIG. 22.

As described in connection with the embodiment of the monitoring system, it may occur that the machine component to be monitored is the ball screw mechanism shown in FIG. 23.

The sensor 3 is capable of detecting a factor associated with the lifetime of the machine component 1, and may be, for example, a vibration sensor, a temperature sensor, or the like. Alternatively, the sensor 3 may be an imaging element for imaging the machine component 1, or a rotation sensor, a speed sensor, a pressure detecting sensor, or the like.

The business establishment 102 of the client corporation is provided with a sensor information transmitting unit 110 transmitting through a line 109, sensor information 11, which is raw information (non-processed data) detected by the sensor 3 or information obtained by processing the raw information detected by the sensor 3. According to one aspect, the line 109 may be either a public telephone line or a dedicated line.

The sensor information transmitting unit 110 includes an information collecting section 111 collecting information detected by each of the sensors 3 provided one for each of the machine components 1, and an information transmitting section 112 transmitting the information collected by the information collecting section 111 to the line 109.

The sensor information transmitting unit 110 must be capable of transmitting the information detected by the sensor 3 to the line 109, and may be an electric appliance having a limited function, a computer such as, for example, a personal computer or the like, or any other general purpose information processing appliance. The sensor information transmitting unit 110 may also be either a stand-alone appliance or a plurality of appliances connected with each other. Where the sensor information transmitting unit 110 is of a type including the information collecting section 111 and the information transmitting section 112, a data collector which is an electronic appliance may be used for the information collecting section 111 and a controller which is a different electronic appliance may be employed for the information transmitting section 112. According to one aspect, the sensor information transmitting unit 110 includes a storage unit storing the sensor information 11 acquired from the sensor 3. This storage unit may be disposed in either the information collecting section 111 or the information transmitting section 112, or may be separate from both the information collecting section 111 and the information transmitting section 112.

The information to be transmitted from the sensor 3 to the sensor information transmitting unit 110 and the sensor information 11 to be transmitted from the sensor information transmitting unit 110 are preferably in accord with a predefined range, for example, a standard stipulated by the manufacturing and selling corporation 101.

The business establishment 101 of the manufacturing and selling corporation is provided with a sensor information receiving unit 113 receiving the sensor information 12 transmitted through the line 109 and a diagnosing unit 114 diagnosing the lifetime state of the machine component 1 based on the sensor information 11 received by the sensor information receiving unit 113. The business establishment 101 is also provided with a merchandise information adding unit 115 to add merchandise information to a diagnosis result information 12, depending on the diagnosis result information 12, and a diagnosis result information transmitting unit 116 transmitting the diagnosis result information 15, which has been added with the merchandise information, to the line 109.

The business establishment 101 of the manufacturing and selling corporation, although collectively referred to as a business establishment, may be a group of a plurality of business establishments. In the instance now under discussion, the business establishment 101 is divided into a business establishment 101A of a technical and research department and a business establishment 101B of a sales and production department. It is to be noted that the business establishment 101B of the sales and production department is specifically divided into a business establishment of a sales department, and a factory, which is a business establishment of a production department, and the business establishment of the sales department is distributed at various places.

The sensor information receiving unit 113 and the diagnosing unit 114 are provided in the business establishment 101A (the technical and research department of the business establishment 101), whereas the merchandise information adding unit 115 and the diagnosis result information transmitting unit 116 are provided in the business establishment 101B (the sales and production department). The business establishment 101B is also provided with an order receipt processing unit 124, a merchandise storage section 125, a merchandise production unit 126, a decision making unit 127, and a diagnosis result utilization production planning support unit 128.

Through the line 109, the sensor information receiving unit 113 receives the sensor information 11 from the sensor information transmitting unit 110 at the business establishment 102 of the client corporation. And the sensor information receiving unit 113 also identifies the business establishment 102 that transmitted such information. In other words, the sensor information receiving unit 113 functions as an information managing interface. The sensor information receiving unit 113 may be a general purpose information processing appliance having a communication function such as, for example, a computer or the like, or a special-purpose electronic appliance. Also, according to one aspect, the sensor information receiving unit 113 is provided with a sensor information storage unit (not shown) to store the received sensor information 11.

Figure 29A:
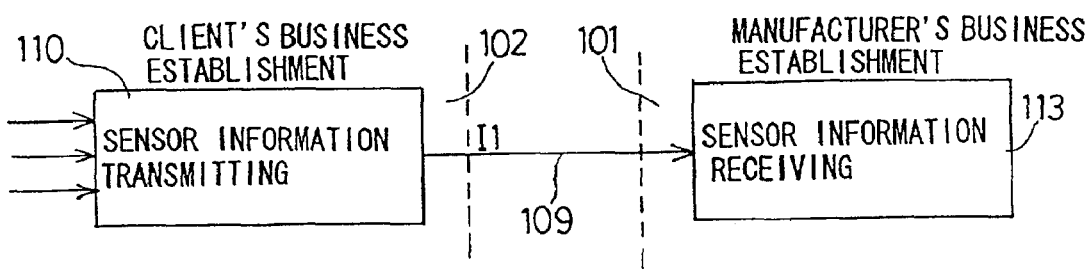
FIG. 29A illustrates the case in which transmission and receipt of the sensor information between a client corporation and a manufacturing and selling corporation take place at all times.
Figure 29B:
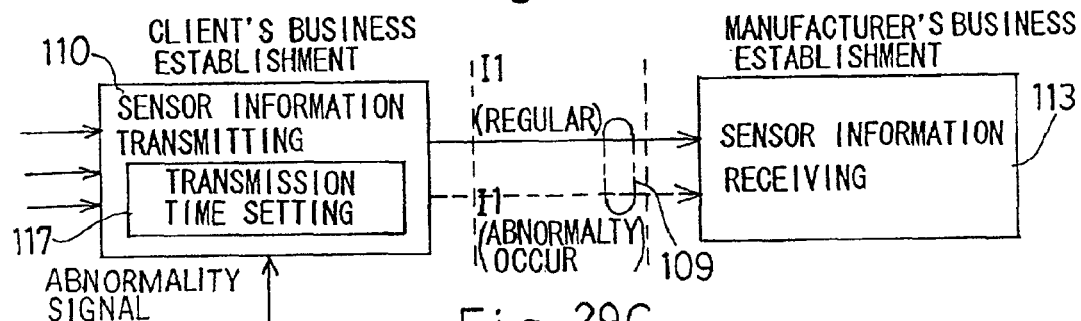
FIG. 29B illustrates the case in which transmission and receipt of the sensor information between a client corporation and a manufacturing and selling corporation take place on a regular basis.
Figure 29C:
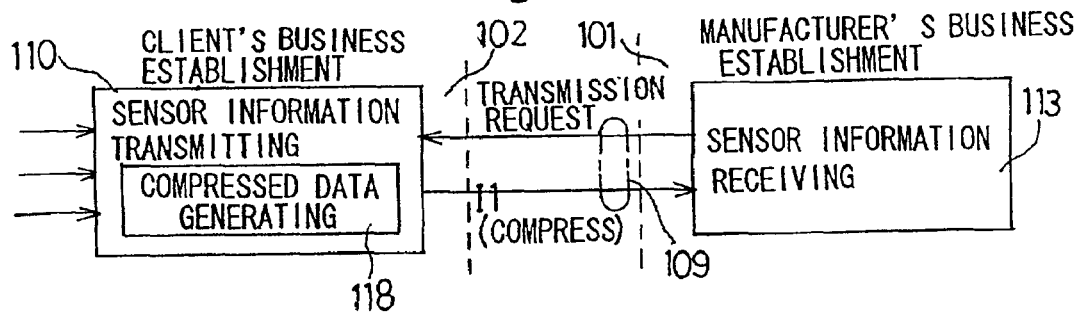
FIG. 29C illustrates the case in which transmission and receipt of the sensor information between a client corporation and a manufacturing and selling corporation take place in response to a transmission request.

Communication between the sensor information transmitting unit 110 and the sensor information receiving unit 113 may be carried out in any suitable manner. By way of example, any of the manners of communication between the sensor information transmitting unit 110 and the sensor information receiving unit 113, as shown in FIGS. 29A to 29C, can be employed. Specifically, FIG. 29A illustrates the sensor information 11 being transmitted at all times. The regular transmission of the sensor information 11 may be take place 24 hours a day or only during the working hours of the business establishment 101 of the manufacturing and selling corporation, or that the working hours of the business establishment 102 of the client corporation. In the case of the regular transmission, it is possible for the diagnosing unit 114 to perform diagnosis on a real-time basis.

FIG. 29B illustrates a periodical transmission of the sensor information 11. In such case, the sensor information 11 is transmitted at a time set by a transmission time setting unit 117 provided in the sensor information transmitting unit 110. The interval of the periodical transmission may be set to match with the time or the operating period of the machine such as once a day at a predetermined time, or at intervals of a predetermined time such as, for example, at intervals of one hour. According to one aspect, in the case of the periodical transmission, in addition to the transmission at a predetermined time, the sensor information 11 is transmitted at the time of occurrence of a predetermined machine trouble, that is, at the time a predetermined abnormality occurs in the machine. The time of occurrence of the predetermined machine trouble may be, for example, the time at which the machine 103 utilizing the machine components 1 is scrammed, at which time the machine trouble can be recognized by the sensor information transmitting unit 110 in reference to an abnormality signal generated from a controlling device of the machine 103.

FIG. 29C illustrates the manner in which the sensor information 11 is transmitted in response to a transmission request. The sensor information transmitting unit 110 and the sensor information receiving unit 113 are capable of accomplishing a bi-directional communication. In the instance shown therein, the line 109 is built up in response to the transmission request from the sensor information receiving unit 113 and the sensor information 11 is then transmitted from the sensor information transmitting unit 110. In such a case, the sensor information transmitting unit 110 is provided with a compressed data generating unit 118 to process the information, obtained from the sensor 3, and compress data so that the sensor information 11 can be transmitted as a compressed data.

Referring to FIG. 26, the diagnosing unit 114 diagnoses the lifetime status of the machine component 1 in reference to the sensor information 11 received by the sensor information receiving unit 113. This diagnosing unit 114 can output a diagnosis result information which preferably includes a result of determination of whether or not the machine component 1 is properly usable, and a result of determination of how long the machine component can be usable if it is determined that the machine component 1 is usable.

The diagnosing unit 114 is used in diagnosing information of the specification for each of the machine components 1 registered in a database 119. This diagnosing unit 114 is also used in diagnosing information of examples of diagnosis registered in the database 119. In the database 119, the examples of diagnosis are registered for each type of the machine components 1. The information on the specification of the machine components for each type and the examples of diagnosis, although shown as registered in the same database 119, may be registered in different databases.

The diagnosing unit 114 is usable in diagnosing information on the environment of use in which the machine components 1 registered in a database 120 are used, i.e. the diagnosing unit 114 is usable in diagnosing information on client corporations. The use environment information may include information about operating conditions such as, for example, the rotational speed, the load, and/or the frequency of use, in which the machine components 1 are operated, and information on the environment such as, for example, dusts, under which the machine components 1 are operated. The client information is unique for each of the client corporations and, where any request has been made in connection with standards associated with the diagnosis, the client information may include information on such request.

The diagnosing unit 114 includes an examining section 121 which automatically performs, in response to the sensor information 11, determination of whether or not the machine component 1 is properly usable, and a manual diagnosing section 122, in which a result of diagnosis performed by a person, is added to the result of determination performed by the examining section 121, or which performs a modification based on the result of diagnosis performed by a person. The examining section 121 preferably has not only a capability of outputting the result of determination of whether or not the machine component 1 is properly usable, but also a capability of outputting the result of determination of the period during which the machine component 1 can be used.

The examining section 121 may be a determination-oriented electronic appliance or a general purpose computer.

The manual diagnosing section 122 displays information on vibration waveforms or the like based on the sensor information 11 so that they can be perceived by human ears and eyes, and enables a person to add a result of diagnosis, or input a modification, and may comprises a computer or the like. The additional result of diagnosis has contents that can be diagnosed by the attendant worker, although it does not appear in the examining section 121 as a result of determination, and it may be added to the result of diagnosis as a comment.

According to one aspect, the examining section 121 employs a waveform analyzer. At another aspect, the examining section employs a frequency analyzer where, for example, the sensor information 11 is vibration information. According to yet another aspect, where the sensor information 11 is temperature information, the examining section 121 compares the temperature with a predetermined value or the like. According to one aspect, the examining section 121 determines results of analysis of a plurality of kinds of sensor information 11, such as vibration information, temperature information or the like.

The determination standard employed by the examining section 121 is a reference value set in the examining section 121, or a determination standard registered in the database 119.

Examples of waveform analysis performed by the examining section 121 will now be described with reference to FIG. 6, which has been referred to in connection with the description of the embodiment of the monitoring system. The sensor information 11 containing the defect signal can be classified into the main signal and the defect signal. Based on the defect signal, determination of the lifetime is carried out.

Any of the following methods can be employed to determine which one of the machine components 1 is currently diagnosed by the diagnosing unit 114.

Machine type information on the machine components 1 transmitted together with the sensor information 11 is used.

In such case, by adding information necessary to identify what machine component 1 is installed where in the machine 103 of which one of the business establishments 102 of what client corporation, the individual machine components 1 can be recognized by the diagnosing unit 114.

By providing the diagnosing unit 114 or the sensor information receiving unit 113 with a management function to identify the machine to be diagnosed or for which the sensor information 11 being received is associated, the sensor information 11 inputted to the diagnosing unit 114 is selected. In this case, the management function of the diagnosing unit 114 or the sensor information receiving unit 113 may be the one used to identify what machine component 1 is installed where in the machine 103 of which one of the business establishments 102 of what client corporation.

The merchandise information adding unit 115 generates merchandise information associated with the machine component to be diagnosed in accordance with the information on the results of diagnosis performed by the diagnosing unit 114, and adds the merchandise information to the diagnosis result information. The merchandise information added includes price information and delivery date information. This merchandise information adding unit 115 is registered with stock information (inclusive of the number of component parts in stock and the place where they are stocked) for each of the machine types registered in a database 123, price information and delivery data information. According to one aspect, the database 123 includes production planning information, and the merchandise information adding unit 115, when no stock available, sets the delivery date information to be added as merchandise information, in reference to the delivery date information contained in the production planning information.

According to one aspect, the merchandise information adding unit 115 uses the merchandise information as estimate information, including information asking if there is a will to order.

It is to be noted that where the machine component 1 requires repair, not replacement, information on the result of diagnosis that repair is sufficient is given by the diagnosing unit 114 to the merchandise information adding unit 115, and the merchandise information adding unit 115 then adds repair information, registered in the database 123, as the merchandise information.

The information on the result of diagnosis of the merchandise information addition generated by the merchandise information adding unit 115 is transmitted from the diagnosis result information transmitting unit 116 to the line 109.

The diagnosis result information transmitting unit 116 provided at the business establishment 101B of the sales and production department transmits the diagnosis result information and the added merchandise information. However, separate therefrom the the diagnosis result information transmitting means (not shown) at the business establishment 101A of the technical and research department may be used, so that the diagnosis result information generated by the diagnosing unit 114 can be directly transmitted to the client corporation through the line 109.

The business establishment 102 of the client corporation is provided with a diagnosis result information receiving unit 131 in, for example, a housekeeping department 130, or the like, so that the diagnosis result information added with the merchandise information that is transmitted from the diagnosis result information transmitting unit 116 of the manufacturing and selling corporation to the line 109 can be received. This diagnosis result information receiving unit 131 includes an order processing section 132 that can output to the line 109 agreement information 16 agreeing to the estimation information included in the merchandise information contained in the received diagnosis result information 15. The agreement information 16 can be received by the diagnosis result information transmitting unit 116 and processed by the order receipt processing unit 124. The order receipt processing unit 124 transmits delivery arrangement information to the merchandise storage section 125, in accordance with contents of the order contained in the agreement information 16. The merchandise storage section 125 may be a plant or factory, or a depository in the marketing route, a repository of an agent. The merchandise storage section 125 transports by a truck, and then delivers the machine component 1, to the business establishment 102 of the client corporation, according to the delivery arrangement information.

After the delivery, a decision is made between the client corporation and the decision making unit 127 of the manufacturing and selling corporation. This decision may be the one done by means of electronic information. Alternatively or in combination therewith, the decision may be done with the intervention of an external decision making agency 129, such as a bank.

The diagnosis result utilization production planning support unit 128 is provided in a production department (production management department), and generates demand forecast information which is the diagnosis result information of the diagnosing unit which has been processed statistically.

Figure 27:
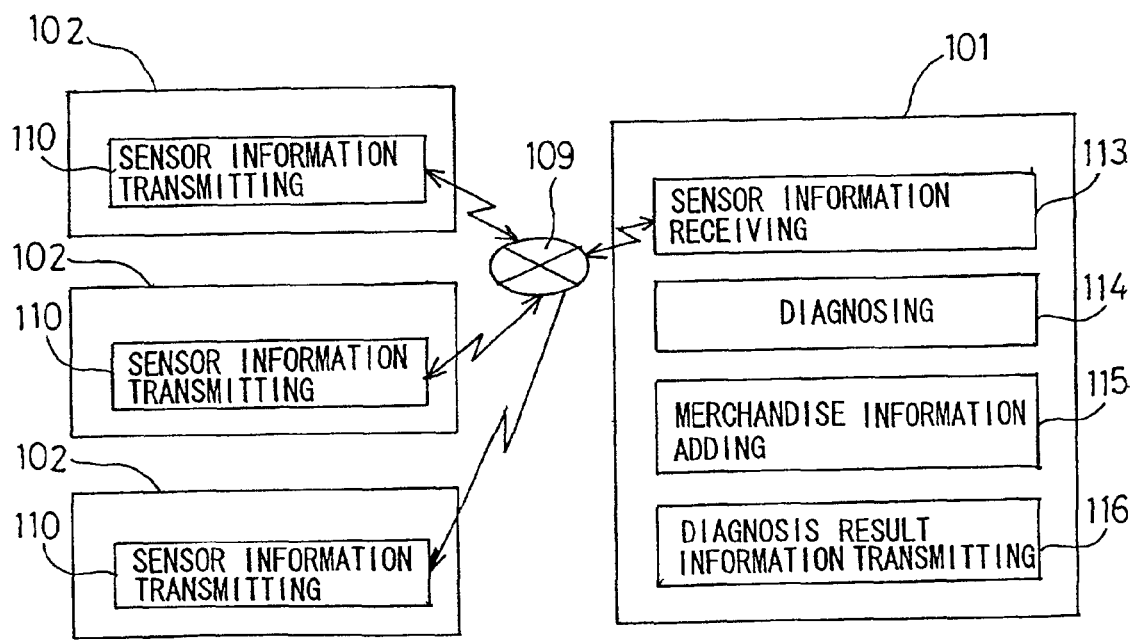
FIG. 27 is a block diagram showing an multi:1 connection of the monitoring, diagnosing and selling system.

FIG. 27 illustrates a relationship between a plurality of business establishments 102 of the client corporation and the business establishments 101 of the manufacturing and selling corporation. The business establishments 102 of the client corporation and the business establishment 101 of the manufacturing and selling corporation are generally in a multi vs. 1 relation or a multi vs. multi relation.

Figure 28:
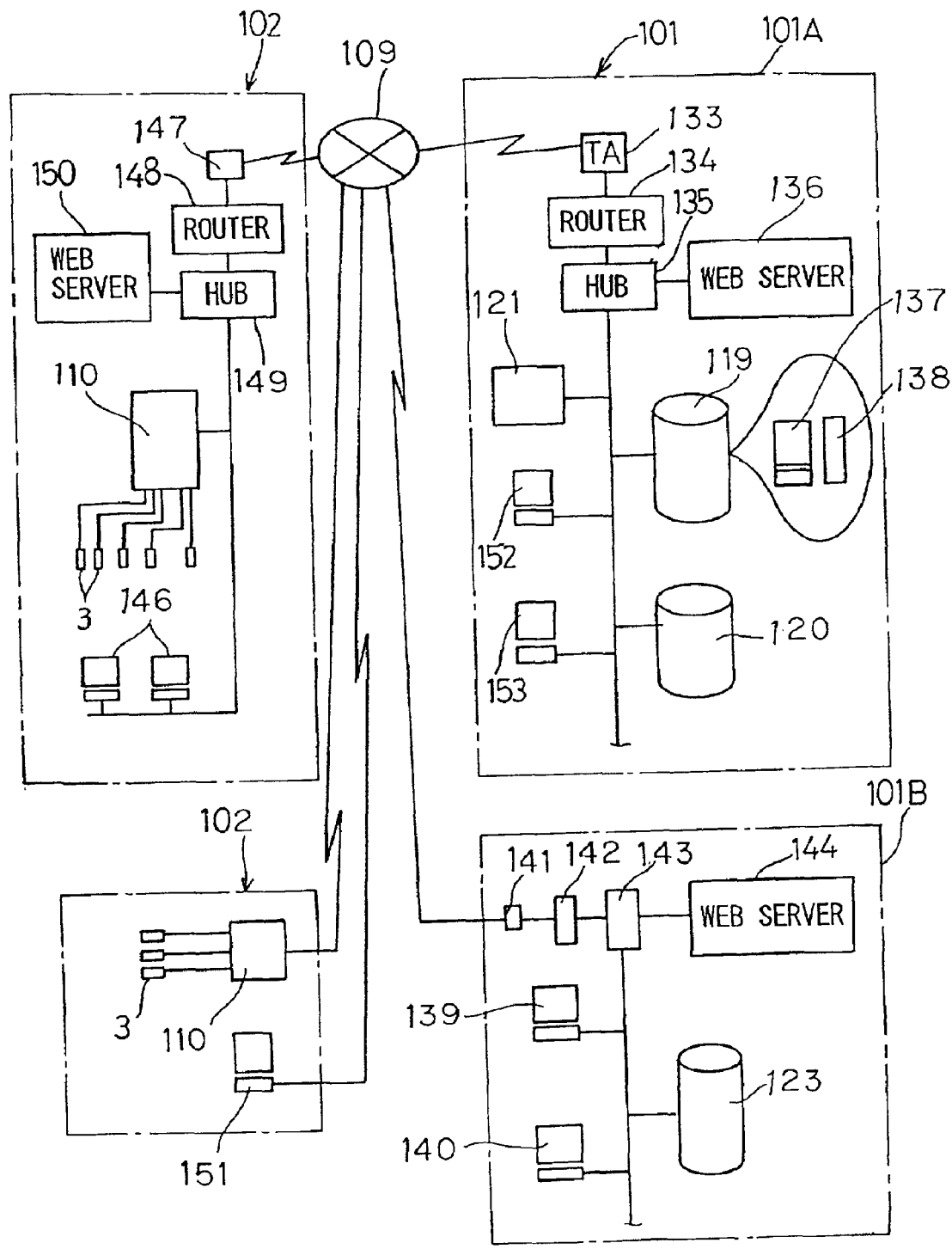
FIG. 28 is an explanatory diagram of a hardware structure of the monitoring, diagnosing and selling system.

FIG. 28 illustrates a hardware structure of the machine component monitoring and diagnosing system for the machine components. As is shown therein, the business establishment 101A of the technical and research department of the manufacturing and selling corporation has a local network area in which the examining section 121, a plurality of computers 152 and 153, and the databases 119 and 120 are connected together, which is in turn connected with the line 109 through a terminal adapter 133, a router 134, and a hub 135, all of which are supervised by a web server 136. The databases 119 and 120 are constituted by a computer 137 and a large capacity storage unit 138. The router 134, the hub 135, and the web server 136 and others altogether constitute the sensor information receiving unit 113 shown in FIG. 26. Also, the diagnosing unit 114 described hereinbefore is constituted by the computer 152 and others.

A sales section of the business establishment 101B also has a local area network in which a plurality of computers 139 and 140, the database 123 and others are connected together, and which is in turn connected with the line 109 through a terminal adapter 141, a router 142 and a hub 143, all of which are supervised by a web server 144. The computers 139 and 140 form the merchandise information adding unit 115, the diagnosis result information transmitting unit 116, the order processing unit 124, and the decision making unit 127 shown in FIG. 26.

One of the business establishment 102 of the client corporation has a local area network in which a plurality of computers 146, and a controller and others that serve as the sensor information transmitting unit 110, are connected together, and which is in turn connected with the line 109 through a terminal adapter 147, a router 148, and a hub 149, all of which are supervised by a web server 150. The plurality of computers 146 form the diagnosis result information receiving unit 131.

Another one of the business establishments 102 of the client corporation has a controller that serves as the sensor information transmitting unit 110, which is connected directly with the line 109, and also has a computer 151 connected directly with the line 109, which forms the diagnosis result information receiving unit 131.

The flow of processing in this embodiment of the present invention will be described with particular reference to FIG. 26 and FIGS. 30A to 30D.

Detection information from the sensors 3 monitoring the machine components 1 owned by the client corporation is transmitted as the sensor information 11 to the line 109 by the sensor information transmitting unit 110. (FIG. 30A). The sensor information 11 contains data necessary to specify machine components such as, for example, data on component type and data on the place of use of such component.

This sensor information 11 is received by the sensor information receiving unit 113 at the manufacturing and selling corporation 101 and diagnosed by the diagnosing unit 114. For this diagnosis, information registered in the databases 119 and 120 is utilized. Diagnosis result information 12 (FIG. 30B) contains, in addition to the component specifying information, data indicative of whether the component is usable or unusable, and data on the term of use if the component is determined to be usable, and, optionally, human diagnosis information.

The merchandise information 13 is then added to the diagnosis result information 12 by the merchandise information adding unit 115 by referring to the database 123, and the order query information 14 is also added thereto. The merchandise information 13 contains price information and delivery data information. The order query information 14 contains information necessary to prompt inputting for ascertaining the will, i.e. order or reserve, and information on query as to the date of delivery.

The merchandise information added diagnosis result information 15 including the diagnosis result information 12, the merchandise information 13 and the order query information 14 is transmitted from the diagnosis result information transmitting unit 116 to the line 109.

The client corporation receives the merchandise information added diagnosis result information 15 through the diagnosis result information receiving unit 131, examines this information 15 and then causes the order processing section 132 to transmit the agreement information 16 to the line 109. The agreement information 16 is information that places the order and, therefore, includes information descriptive of the will to order and information on the desired date of delivery.

This agreement information 16 is received by the diagnosis result information transmitting unit 116 and processed by the order processing unit 124 and processed so that the delivery and the decision can be made as hereinbefore described.

Although in the foregoing description, the merchandise information added diagnosis result information 15 has been described as associated with one machine component 1, the merchandise information added diagnosis result information 15 is generally transmitted from the diagnosis result information transmitting unit 116 in the form of a group of the merchandise information added diagnosis result information consisting of a table or list enumerating the plural machine components as shown in FIG. 31. Also, the agreement information 16 may be of a design in which with respect to the group of the merchandise information added diagnosis result information a response can be made together with the information on the will to order and the information on the desired date of delivery, or in which with respect to the group of the merchandise information added diagnosis result information the agreement information can be re-edited in the client corporation before transmission.

Also, in the practice of the present invention, arrangement may be made that the diagnosis result information transmitting unit 116 transmits the diagnosis result information with no merchandise information added and also transmit a bulk of the estimate information including the merchandise information for a specific period of days.

With the machine component monitoring and diagnosing system of the present invention, the client corporation can acquire in situ the merchandise information on the machine components 1 together with an accurate result of diagnosis of the machine components 1, and can therefore quickly place an order and convey the expected delivery date. Accordingly, the cost which would be incurred in monitoring and diagnosing the machine components 1 can be reduced advantageously. Additionally, the manufacturing and selling corporation of the machine components 1 can reduce the number of the machine components in stock because of the order made in advance by the client corporation, and can thereby maximize proper production planning.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A machine component monitoring system monitoring machine components used in a machine system, a plurality of said machine components each having rolling elements, said machine component monitoring system comprising:

a control unit;

a plurality of determining units, electrically connected, respectively, with a plurality of sensors, said determining units being electrically connected with the control unit, each of the sensors being arranged on the respective machine component and detecting an influence signal induced in the machine component and resulting from passage of the rolling elements, each of the determining units determining, according to a predetermined process set-up condition, a status of the respective machine component, said status being at least one of presence of an abnormality, absence of an abnormality, and lifetime of the respective machine component, in reference to an output signal from the respective sensor; and said control unit collecting results of determination performed by each of the determining units, wherein when determining the status, each determining unit determines one of a presence of an abnormality and an absence of an abnormality in a sensor waveform, which is the output signal from the associated sensor, and each of the determining units determines whether a defect signal component contained in the sensor waveform deviates from a predefined range, and in the event that the defect signal has been determined as deviating from the predefined range, determines the presence of a defect waveform abnormality as the abnormality in the sensor waveform.

2. The machine component monitoring system as claimed in claim 1, wherein each of the determining units compares sensor waveform main signal cycles of the plural sensors connected therewith, and in the event that the main signal cycle is not found within a predefined range, determines the presence of a rotation abnormality as the abnormality in the sensor waveform.

3. The machine component monitoring system as claimed in claim 1, wherein each of the determining units detects one of a presence and an absence of a determiner abnormality, which is an abnormality resulting from the respective determining unit itself, and a sensor waveform abnormality resulting from the sensor waveform.

4. The machine component monitoring system as claimed in claim 1, wherein the control unit makes a transmission request sequentially to the determining units, and each of the determining units transmits a result of determination to the control unit in response to the transmission request.

5. The machine component monitoring system as claimed in claim 1, wherein the control unit commands setting and changing of the process set-up condition for each of the determining units, and each of the determining units changes the process set-up condition according to the command from the control unit.

6. The machine component monitoring system as claimed in claim 1, wherein each of the determining units has a plurality of waveform processing units processing the sensor waveform according to different waveform processing techniques, and selects one of the waveform processing units that is to be used for processing the sensor waveform, and the control unit applies a selection command necessary to select one of the waveform processing units for the particular determining unit 7. The machine component monitoring system as claimed in claim 1, wherein each of the determining units has a plurality of waveform processing units processing the sensor waveform according to different waveform processing techniques, and selects one of the waveform processing units for each of the sensors.

8. The machine component monitoring system as claimed in claim 1, wherein wiring used to connect the determining units and the associated sensors is a sheathed sensor cable having a sheath that is water proof, dust proof, rust proof, and moisture proof, and resists oil, heat, and electromagnetic noise.

9. The machine component monitoring system as claimed in claim 1, wherein each of the determining units has a relay terminal, and the determining units are sequentially wired together through the respective relay terminals.

10. The machine component monitoring system as claimed in claim 1, wherein the machine system is an aggregation of a plurality of machine system constituent elements, each including the plural machine components, and wherein each of the determining units is used one for each of the machine system constituent elements and the sensor connected with each of the determining units is arranged on the machine component provided in one of the machine system constituent elements that is associated with such determining unit.

11. The machine component monitoring system as claimed in claim 1, wherein the control unit has an automatic monitoring mode and a terminal operated mode, wherein in the automatic monitoring mode, a result of determination performed by each of the determining units is acquired by sequentially issuing a transmission request to request the respective determining unit to send the result of determination, and in the terminal operated mode, when a transmission request is made to request the respective determining unit to send the result of determination and information other than the result of determination, a response thereto is acquired.

12. The machine component monitoring system as claimed in claim 1, wherein each of the determining units captures as digital data, the sensor waveform which is the output signal from each of the sensors connected therewith, and the control unit includes a waveform data storage unit storing the sensor waveform that is the digital data captured by each of the determining units.

13. The machine component monitoring system as claimed in claim 1, further comprising a maintenance information generating unit generating predetermined maintenance information associated with the machine component, based on a result of determination performed by each of the determining units.

14. The machine component monitoring system as claimed in claim 1, further comprising an information processing unit positioned at a location remote from the control unit and connected with the control unit through a communication network, and wherein the control unit collects not only a result of determination performed by each of the determining units, but also a sensor waveform inputted to each determining unit, said information processing unit including a remote data collecting unit collecting the result of determination and the sensor waveform that the control unit has collected from each of the determining units.

15. A machine component monitoring and diagnosing system monitoring and diagnosing a machine component having rolling elements, which system comprises:
   a sensor detecting a factor associated with a lifetime of a machine component incorporated in a machine used at a business establishment of a client corporation;
   a sensor information transmitting unit transmitting at least one of information detected by the sensor and information processed with such detected information to a line;
   a sensor information receiving unit installed at a business establishment of a manufacturing and selling corporation, which manufactures and sells the machine component, receiving the sensor information transmitted through the line;
   a diagnosing unit diagnosing a state of the lifetime of the machine component in reference to the sensor information received by the sensor information receiving unit;
   a diagnosis result information transmitting unit transmitting diagnosis result information from the diagnosing unit to the line; and
   a diagnosis result information receiving unit installed at the business establishment of the client corporation receiving the diagnosis result information transmitted through the line,
   wherein the diagnosing unit includes an examining section to automatically determine, when the sensor information is inputted, whether at least the machine component is properly usable, and a manual diagnosing section to at least one of add a result of diagnosis performed by a person to the result of diagnosis performed by the examining section, and modify the result of diagnosis performed by the examining section based on the result of diagnosis performed by the person.

16. A machine component monitoring and diagnosing system monitoring and diagnosing a machine component having rolling elements, which system comprises:
   a sensor information receiving unit installed at a business establishment of a manufacturing and selling corporation manufacturing and selling the machine component, receiving through a line information detected by a sensor detecting a factor associated with a lifetime of the machine component incorporated in a machine used by a client corporation located at a remote place;
   a diagnosing unit diagnosing a state of the lifetime of the machine component in reference to the sensor information received by the sensor information receiving unit; and
   a diagnosis result information transmitting unit transmitting information on a result of diagnosis by the diagnosing unit to the line,
   wherein the diagnosing unit includes an examining section to automatically determine, when the sensor information is inputted, whether at least the machine component is properly usable, and a manual diagnosing section to at least one of add a result of diagnosis performed by a person to the result of diagnosis performed by the examining section, and modify the result of diagnosis performed by the examining section based on the result of diagnosis performed by the person.

17. The machine component monitoring and diagnosing system as claimed in claim 15, wherein the sensor information transmitting unit includes an information collecting section collecting the information detected by each of sensors, the sensors being provided one for each of a plurality of machine components, and an information transmitting section transmitting the information, collected by the information collecting section, to the line.

18. The machine component monitoring and diagnosing system as claimed in claim 15, wherein the diagnosis result information from the diagnosing unit includes a result of determination of whether the machine component is properly usable, and a result of determination of an available term of use if the machine component has been determined properly usable.

19. The machine component monitoring and diagnosing system as claimed in claim 15, wherein the sensor detects at least one of vibration waveform, temperature, and image.

20. The machine component monitoring and diagnosing system as claimed in claim 15, wherein the diagnosing unit utilizes a database for diagnosis, in which specifications for each type of the machine components and examples of diagnosis are registered.

21. The machine component monitoring and diagnosing system as claimed in claim 15, wherein the diagnosing unit utilizes a database for diagnosis, in which environments of use of the machine components are registered.

22. The machine component monitoring and diagnosing system as claimed in claim 15, wherein each of the sensor information transmitting unit and the sensor information receiving unit performs a bi-directional communication, and the sensor information transmitting unit transmits the sensor information in response to a request signal from the sensor information receiving unit.

23. The machine component monitoring and diagnosing system as claimed in claim 15, wherein the sensor information transmitting unit transmits the sensor information on a regular basis and transmits the sensor information even when a predetermined abnormality signal is received.

24. The machine component monitoring and diagnosing system as claimed in claim 15, wherein the machine in the business establishment of the client corporation has a shaft, and wherein the machine component to be detected by the sensor is a bearing supporting the shaft, said sensor information transmitting unit transmitting sensor information on the bearing to the line.

25. A machine component monitoring, diagnosing, and selling system, which comprises:
a sensor detecting a factor associated with a lifetime of a machine component incorporated in a machine used at a business establishment of a client corporation;
a sensor information transmitting unit transmitting at least one of information detected by the sensor and information processed with such detected information to a line;
a sensor information receiving unit installed at a business establishment of a manufacturing and selling corporation, which manufactures and sells the machine component, receiving the sensor information transmitted through the line;
a diagnosing unit diagnosing a state of the lifetime of the machine component in reference to the sensor information received by the sensor information receiving unit;
a merchandise information adding unit generating merchandise information associated with the diagnosed machine component in accordance with diagnosis result information of the diagnosing unit and adding this merchandise information to the diagnosis result information;
a diagnosis result information transmitting unit transmitting to the line merchandise information added diagnosis result information, which is the diagnosis result information added with the merchandise information; and
a diagnosis result information receiving unit installed at the business establishment of the client corporation and receiving the merchandise information added diagnosis result information transmitted through the line.

26. The machine component monitoring, diagnosing, and selling system as claimed in claim 25, wherein the merchandise information added by the merchandise information adding unit includes price information and delivery date information.

27. The machine component monitoring, diagnosing, and selling system as claimed in claim 25, wherein the merchandise information added by the merchandise information adding unit includes information asking about a will to order, wherein the diagnosis result information transmitting unit includes information asking about the will to order in the merchandise information added diagnosis result information, and wherein the diagnosis result information transmitting unit is capable of conducting a bi-directional communication and capable of receiving agreement information with respect to the information asking about the will to order contained in the merchandise information added diagnosis result information.

28. The machine component monitoring, diagnosing, and selling system as claimed in claim 27, further comprising an order processing unit generating arrangement information of delivery of the machine component according to contents ordered in the agreement information that is received by the diagnosis result information transmitting unit.

29. The machine component monitoring, diagnosing, and selling system as claimed in claim 28, further comprising an electronic decision making unit making a decision according to electronic information in accordance with contents of the order contained in the agreement information received by the diagnosis result information transmitting unit.

30. The machine component monitoring, diagnosing, and selling system as claimed in claim 25, further comprising a diagnosis result utilizing production planning support unit utilizing the diagnosis result of the diagnosing unit in planning a production of the machine component 31. The machine component monitoring, diagnosing, and selling system as claimed in claim 25, wherein the sensor information transmitting unit includes an information collecting section collecting the information detected by each of sensors, the sensors being provided one for each of a plurality of machine components, and an information transmitting section transmitting the information, collected by the information collecting section, to the line.

32. The machine component monitoring, diagnosing, and selling system as claimed in claim 25, wherein the diagnosis result information from the diagnosing unit includes a result of determination of whether the machine component is properly usable and a result of determination of an available term of use, if the machine component has been determined property usable.

33. The machine component monitoring, diagnosing, and selling system as claimed in claim 25, wherein the sensor detects at least one of vibration waveform, temperature, and image.

34. The machine component monitoring, diagnosing, and selling system as claimed in claim 25, wherein the diagnosing unit utilizes for diagnosis a database in which specifications for each type of the machine components and examples of diagnosis are registered.

35. The machine component monitoring, diagnosing, and selling system as claimed in claim 25, wherein the diagnosing unit utilizes for diagnosis a database in which environments of use of the machine components are registered.

36. The machine component monitoring, diagnosing, and selling system as claimed in claim 25, wherein the diagnosing unit includes an examining section to automatically determine, when the sensor information is inputted, whether at least the machine component is property usable, and a manual diagnosing section to at least one of add a result of diagnosis performed by a person to the result of diagnosis performed by the examining section, and modify the result of diagnosis performed by the examining section based on the result of diagnosis performed by the person.

37. The machine component monitoring, diagnosing, and selling system as claimed in claim 25, wherein each of the sensor information transmitting unit and the sensor information receiving unit is capable of performing a bi-directional communication, and the sensor information transmitting unit transmits the sensor information in response to a request signal from the sensor information receiving unit.

38. The machine component monitoring, diagnosing, and selling system as claimed in claim 25, wherein the sensor information transmitting unit transmits the sensor information on a regular basis and transmits the sensor information even when a predetermined abnormality signal is received.

39. The machine component monitoring, diagnosing, and selling system as claimed in claim 25, wherein the machine in the business establishment of the client corporation has a shaft, and wherein the machine component to be detected by the sensor is a bearing supporting the shaft, said sensor information transmitting unit transmitting sensor information on the bearing to the line.

40. A machine component monitoring, diagnosing, and selling system monitoring, diagnosing, and selling a machine component having rolling elements, which system comprises:
   a sensor Information receiving unit installed at a business establishment of a manufacturing and selling corporation, which manufactures and sells the machine component, receiving through a line information detected by a sensor detecting a factor associated with lifetime of a machine component incorporated in a machine used at a business establishment of a client corporation at a remote location;
   a diagnosing unit diagnosing a state of the lifetime of the machine component in reference to the sensor information received by the sensor information receiving unit;
   a merchandise information adding unit generating merchandise information associated with the diagnosed machine component in accordance with diagnosis result information of the diagnosing unit and adding this merchandise information to the diagnosis result information; and
   a diagnosis result information transmitting unit transmitting to the line merchandise information added diagnosis result information, which is the diagnosis result information added with the merchandise information.

41. A machine component monitoring and diagnosing method monitoring and diagnosing a machine component having rolling elements through a computer network, which method comprises, at a business establishment of a corporation manufacturing and selling the machine component:
   receiving through a line, information detected by a sensor detecting a factor associated with a lifetime of the machine component, incorporated in a machine used by a client corporation at a remote location;
   diagnosing a status of lifetime of the machine component based on the received sensor information by using an examining section and a manual diagnosing section;
   transmitting diagnosis result information, obtained as a result of the diagnosing, to the client corporation through the line; and
   planning a production of the machine component using a diagnosis result utilizing production planning support unit utilizing the diagnosis result information.

42. A machine component monitoring and diagnosing method monitoring, diagnosing, and selling a machine component having rolling elements, which method comprises, at a business establishment of a corporation manufacturing and selling the machine component:
   receiving through a line, information detected by a sensor detecting a factor associated with a lifetime of a machine component, incorporated in a machine used by a client corporation at a remote location;
   diagnosing a status of lifetime of the machine component based on the received sensor information by using an examining section and a manual diagnosing section;
   generating merchandise information associated with the diagnosed machine component in accordance with diagnosis result information obtained as a result of the diagnosing, and transmitting the diagnosis result information, together with the merchandise information to the client corporation, through the line; and
   planning a production of the machine component using a diagnosis result utilizing production planning support unit utilizing the diagnosis result information.

43. A system, comprising:
   a sensor sensing a factor associated with a lifetime of a machine component incorporated in a client's machine, said machine having rolling elements;
   a sensor information transmitting unit transmitting sensed information to a manufacturer of the machine component;
   a diagnosing unit using the sensed information to diagnose a state of the machine component and estimate a remaining life of the machine component, said diagnosing unit having an automated examining section and a manual diagnosing section;
   a merchandise information adding unit generating and adding merchandise information associated with the diagnosed machine component in accordance with diagnosis result information of the diagnosing unit
   a diagnosis result information transmitting unit transmitting the merchandise information and the diagnosis result information to the client; and
   a diagnosis result utilizing production planning support unit utilizing the diagnosis result of the diagnosing unit to plan a production of the machine component.

44. A machine component monitoring system monitoring machine components used in a machine system, a plurality of said machine components each having rolling elements, said machine component monitoring system comprising:

a control unit;

a plurality of determining units, electrically connected, respectively, with a plurality of sensors, said determining units being electrically connected with the control unit, each of the sensors being arranged on the respective machine component and detecting an influence signal induced in the machine component and resulting from passage of the rolling elements, each of the determining units determining, according to a predetermined process set-up condition, a status of the respective machine component, said status being at least one of presence of an abnormality, absence of an abnormality, and lifetime of the respective machine component, in reference to an output signal from the respective sensor; and said control unit collecting results of determination performed by each of the determining units, wherein when determining the status, each determining unit determines one of a presence of an abnormality and an absence of an abnormality in a sensor waveform, which is the output signal from the associated sensor; and each of the determining units compares sensor waveform main signal cycles of the plural sensors connected therewith, and in the event that the main signal cycle is not found within a predefined range, determines the presence of a rotation abnormality as the abnormality in the sensor waveform.

45. A machine component monitoring system monitoring machine components used in a machine system, a plurality of said machine components each having rolling elements, said machine component monitoring system comprising:

a control unit;

a plurality of determining units, electrically connected, respectively, with a plurality of sensors, said determining units being electrically connected with the control unit, each of the sensors being arranged on the respective machine component and detecting an influence signal induced in the machine component and resulting from passage of the rolling elements, each of the determining units determining, according to a predetermined process set-up condition, a status of the respective machine component, said status being at least one of presence of an abnormality, absence of an abnormality, and lifetime of the respective machine component, in reference to an output signal from the respective sensor; and said control unit collecting results of determination performed by each of the determining units, wherein when determining the status, each determining unit determines one of a presence of an abnormality and an absence of an abnormality in a sensor waveform, which is the output signal from the associated sensor, and wiring used to connect the determining units and the associated sensors is a sheathed sensor cable having a sheath that is water proof, dust proof, rust proof, and moisture proof, and resists oil, heat, and electromagnetic noise.

46. A machine component monitoring system monitoring machine components used in a machine system, a plurality of said machine components each having rolling elements, said machine component monitoring system comprising:

a control unit;

a plurality of determining units, electrically connected, respectively, with a plurality of sensors, said determining units being electrically connected with the control unit, each of the sensors being arranged on the respective machine component and detecting an influence signal induced in the machine component and resulting from passage of the rolling elements, each of the determining units determining, according to a predetermined process set-up condition, a status of the respective machine component, said status being at least one of presence of an abnormality, absence of an abnormality, and lifetime of the respective machine component, in reference to an output signal from the respective sensor; and said control unit collecting results of determination performed by each of the determining units, wherein when determining the status, each determining unit determines one of a presence of an abnormality and an absence of an abnormality in a sensor waveform, which is the output signal from the associated sensor, each of the determining units has a relay terminal, and the determining units are sequentially wired together through the respective relay terminals.

47. A machine component monitoring system monitoring machine components used in a machine system, a plurality of said machine components each having rolling elements, said machine component monitoring system comprising:

a control unit;

a plurality of determining units, electrically connected, respectively, with a plurality of sensors, said determining units being electrically connected with the control unit, each of the sensors being arranged on the respective machine component and detecting an influence signal induced in the machine component and resulting from passage of the rolling elements, each of the determining units determining, according to a predetermined process set-up condition, a status of the respective machine component, said status being at least one of presence of an abnormality, absence of an abnormality, and lifetime of the respective machine component, in reference to an output signal from the respective sensor, and said control unit collecting results of determination performed by each of the determining units, wherein when determining the status, each determining unit determines one of a presence of an abnormality and an absence of an abnormality in a sensor waveform, which is the output signal from the associated sensor, and the machine system is an aggregation of a plurality of machine system constituent elements, each including the plural machine components, and wherein each of the determining units is used one for each of the machine system constituent elements and the sensor connected with each of the determining units is arranged on the machine component provided in one of the machine system constituent elements that is associated with such determining unit.

* * * * *

UNITED STATES PATENT AND TRADEMARK OFFICE
CERTIFICATE OF CORRECTION

PATENT NO. : 6,983,207 B2  
DATED : January 3, 2006  
INVENTOR(S) : Yasuhiro Gotou et al.

It is certified that error appears in the above-identified patent and that said Letters Patent is hereby corrected as shown below:

<u>Title page,</u>  
Item [57], ABSTRACT,  
Line 13, delete "sensors" and insert -- sensor --.

<u>Column 33,</u>  
Line 12, after "unit" insert -- . --.

<u>Column 36,</u>  
Line 63, delete "property" and insert -- properly --.

<u>Column 37,</u>  
Line 14, delete "property" and insert -- properly --.  
Line 44, delete "Information" and insert -- information --.

<u>Column 38,</u>  
Line 58, after "unit" insert -- ; --.

<u>Column 39,</u>  
Line 25, delete "sensor;" and insert -- sensor, --.

<u>Column 40,</u>  
Line 48, delete "sensor," and insert -- sensor; --.  
Line 48, begin new paragraph after "and" and before "said control unit".

Signed and Sealed this

Sixth Day of June, 2006

JON W. DUDAS  
*Director of the United States Patent and Trademark Office*